United States Patent
Hwang et al.

(10) Patent No.: US 9,860,607 B2
(45) Date of Patent: Jan. 2, 2018

(54) METHOD AND APPARATUS FOR TRANSMITTING AND RECEIVING BROADCAST SIGNAL FOR PROVIDING TRICK PLAY SERVICE

(71) Applicant: LG ELECTRONICS INC., Seoul (KR)

(72) Inventors: Soojin Hwang, Seoul (KR); Hyunmook Oh, Seoul (KR); Jongyeul Suh, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 14/423,980

(22) PCT Filed: Nov. 18, 2014

(86) PCT No.: PCT/KR2014/011042
§ 371 (c)(1),
(2) Date: Feb. 25, 2015

(87) PCT Pub. No.: WO2015/080414
PCT Pub. Date: Jun. 4, 2015

(65) Prior Publication Data
US 2016/0261924 A1   Sep. 8, 2016

Related U.S. Application Data

(60) Provisional application No. 61/910,416, filed on Dec. 1, 2013, provisional application No. 61/952,140, filed
(Continued)

(51) Int. Cl.
*H04N 21/6587* (2011.01)
*H04N 21/2387* (2011.01)
(Continued)

(52) U.S. Cl.
CPC ......... *H04N 21/6587* (2013.01); *G11B 27/10* (2013.01); *H04N 19/31* (2014.11);
(Continued)

(58) Field of Classification Search
CPC ........... H04N 21/4722; H04N 21/4821; H04N 21/6581; H04N 21/4222; H04N 21/4394; H04N 21/4126; H04N 21/42209
See application file for complete search history.

(56) References Cited

U.S. PATENT DOCUMENTS

| | | |
|---|---|---|
| 2001/0036269 A1 | 11/2001 | Morinaga et al. |
| 2002/0118680 A1 | 8/2002 | Lee |

(Continued)

FOREIGN PATENT DOCUMENTS

| | | |
|---|---|---|
| JP | 2008-294512 A | 12/2008 |
| KR | 10-2004-0011819 A | 2/2004 |

(Continued)

OTHER PUBLICATIONS

ETSI TS 101 154 V1.11.1 (Nov. 2012) Digital Video Broadcasting (DVB); Specification for the use of Video and Audio Coding in Broadcasting Applications based on the MPEG-2 Transport Stream, pp. 163-167.*

(Continued)

*Primary Examiner* — Chenea Smith
(74) *Attorney, Agent, or Firm* — Birch, Stewart, Kolasch & Birch, LLP

(57) ABSTRACT

A method and apparatus for transmitting and receiving a broadcast signal for a trick play are disclosed. The broadcast signal transmitting method includes encoding video data to create a video elementary stream (ES), creating a packetized elementary stream (PES) including the video elementary stream (ES), creating a transport stream (TS) including the created PES, wherein the TS includes PVR assist informa- (Continued)

tion for executing a trick play, the PVR assist information includes tier number information and maximum temporal identification information, and the tier number information indicates a tier number having a value obtained by adding 1 to a temporal identification information value of a picture different from a RAP picture and the maximum temporal identification information indicates a maximum temporal identification information value of the video elementary stream (ES) including the encoded video data, and transmitting the created TS.

18 Claims, 27 Drawing Sheets

Related U.S. Application Data on Mar. 13, 2014, provisional application No. 61/954,615, filed on Mar. 18, 2014, provisional application No. 61/970,910, filed on Mar. 27, 2014.

(51) Int. Cl.

| | | |
|---|---|---|
| *H04N 21/236* | (2011.01) | |
| *H04N 21/432* | (2011.01) | |
| *H04N 21/6336* | (2011.01) | |
| *H04N 21/81* | (2011.01) | |
| *H04N 21/845* | (2011.01) | |
| *H04N 21/854* | (2011.01) | |
| *G11B 27/10* | (2006.01) | |
| *H04N 21/4147* | (2011.01) | |
| *H04N 21/6379* | (2011.01) | |
| *H04N 21/658* | (2011.01) | |
| *H04N 19/70* | (2014.01) | |
| *H04N 19/31* | (2014.01) | |

(52) U.S. Cl.
CPC ......... *H04N 19/70* (2014.11); *H04N 21/2387* (2013.01); *H04N 21/23605* (2013.01); *H04N 21/23614* (2013.01); *H04N 21/4147* (2013.01); *H04N 21/4325* (2013.01); *H04N 21/6336* (2013.01); *H04N 21/6379* (2013.01); *H04N 21/6581* (2013.01); *H04N 21/816* (2013.01); *H04N 21/8453* (2013.01); *H04N 21/8456* (2013.01); *H04N 21/85406* (2013.01)

(56) References Cited

U.S. PATENT DOCUMENTS

| | | | |
|---|---|---|---|
| 2004/0022313 A1 | 2/2004 | Kim | |
| 2009/0323822 A1 | 12/2009 | Rodriguez et al. | |
| 2013/0308926 A1 | 11/2013 | Jang et al. | |
| 2015/0063790 A1* | 3/2015 | Rodriguez | G11B 27/005 386/351 |

FOREIGN PATENT DOCUMENTS

| | | |
|---|---|---|
| KR | 10-2007-0119351 A | 12/2007 |
| KR | 10-0816603 B1 | 3/2008 |

OTHER PUBLICATIONS

Anonymous, "High Efficiency Video Coding," Wikipedia, the free encyclopedia, retrieved from URL:https://en.wikipedia.org/w/index.php?title=High_Efficiency_Video_Coding &oldid=583824723, Nov. 29, 2013, pp. 1-28, XP055358330.

Anonymous, "Packetized Elementary Stream," Wikipedia, the free encyclopedia, retrieved from URL:https://en.wikipedia.org/w/index.php?title=Packetized_elementary_stream&oldid=574561501, Sep. 26, 2013, pp. 1-4, XP055358326.

Deshpande, "Comments on SHVC and MV-HEVC," Joint Collaborative Team on Video Coding (JCT-VC) of ITU-T SG 16 WP 3 and ISO/IEC JTC 1/SC 29/WG 11, 15th and 6th Meeting, JCTVC-O0116/JCT3V-F0061, Geneva, CH, Oct. 23-Nov. 1, 2013, pp. 1-8, XP030131468.

Hendry et al., "AHG 9: On Random Access Point NAL Units," Joint Collaborative Team on Video Coding (JCT-VC) of ITU-T SG 16 WP 3 and ISO/IEC JTC 1/SC 29/WG 11, 11th Meeting, JCTVC-K0166, Shanghai, CN, Oct. 10-19, 2012, pp. 1-8, XP030113048.

Digital Video Broadcasting (DVB), "Specification for the Use of Video and Audio Coding in Broadcasting Applications Based on the MPEG-2 Transport Stream," Draft ETSI TS 101 154, V2.1.1, Oct. 2014 (EPO Server date Oct. 2, 2014), pp. 1-226, XP014215858.

DVB Organization, "TM-AVC0600_HEVC-strawman-proposal.docx," Draft, TS 101 154 v1.12.1, Sep. 11, 2013, 42 pages, XP017842484.

* cited by examiner

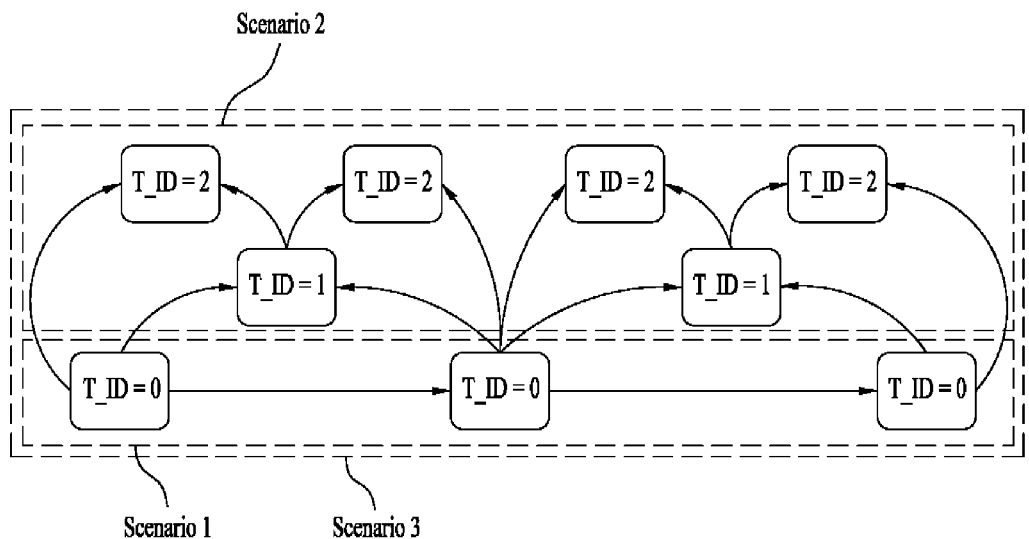

FIG. 3

```
Syntax
aligned(8) class HEVCNALBox
                extends Box('hvcn')
{
                HEVCDecoderConfigurationRecord()HEVCConfig;
}
```

FIG. 4

| Element | Definition | Value | Card |
|---|---|---|---|
| HighDynamicRange | | xs:string | 0..1 |

FIG. 5

| Random access point pictures | IDR | Instantaneous decoding refresh | Without associated leading picture |
| --- | --- | --- | --- |
| | | | May have associated leading picture |
| | BLA | Broken link access | Without associated leading picture |
| | | | May have associated RADL pictures but without associated RASL pictures |
| | | | May have associated RADL and RASL |
| | CRA | Clean random access | |
| Leading picture | RADL | Random access decodable leading picture | |
| | RASL | Random access skipped leading picture | Not-used for reference in the same sub-layer |
| Temporal sub-layer access pictures | TSA | Temporal sub-layer access | May be used for reference in the same sub-layer |
| | | | Not-used for reference in the same sub-layer |
| | STSA | Step-wise temporal sub-layer access | May be used for reference in the same sub-layer |
| | | | Not-used for reference in the same sub-layer |
| Non-constrained | | | May be used for reference in the same sub-layer |
| | | | Not-used for reference in the same sub-layer |

FIG. 10

```
aligned(8) class TrickPlayBox
            extends Fullbox('trikhvc', version=0, flags=0)
{
            for (i=0; I<sample_count, i++){
                        unsigned int(4) pic_type;
                        unsigned int(6) dependency_level;
                        unsigned int(6) reserved;
            }
}
```

FIG. 11

```
aligned(8) class TrickPlayBox
            extends Fullbox('trik', version=0, flag)
{
            if (flags=0)
                        for (i=0; i<sample_count, i++){
                                    unsigned int(2) pic_type;
                                    unsigned int(6) dependency_level;
                        }
            else
                        for (i=0; i<sample_count, i++){
                                    unsigned int(4) pic_type;
                                    unsigned int(6) dependency_level;
                                    unsigned int(6) reserved;
                        }
}
```

FIG. 12

| pic_type | Description | Reference(nal_unit_type) |
|---|---|---|
| 0 | IDR without associated leading picture | IDR_N_LP |
| 1 | DR with Decodable Leading Picture | IDR_W_RADL |
| 2 | BDR with Decodable Leading Picture | BLA_N_LP |
| 3 | BLA may have associated RADL pictures but without associated RASL pictures | BLA_W_RADL |
| 4 | BLA may have associated RADL and RASL | BLA_W_LP |
| 5 | CRA may have associated leading pictures | CRA_NUT |
| 7 | Random access decodable leading picture | RADL_N, RADL_R |
| 8 | Random access skipped leading picture | RASL_N, RASL_R |
| 9 | Unconstrained I-picture | |
| 10 | Unknown | |
| 11~15 | Reserved | |

FIG. 13

```
aligned(8) class TrickPlayBox
            extends Fullbox('trikhvc', version=0, flags=0)
{
            for (i=0; i<sample_count, i++){
                        unsigned int(3) pic_type;
                        unsigned int(5) dependency_level;
            }
}
```

```
aligned(8) class TrickPlayBox
            extends Fullbox('trik', version=0, flags)
{
            if (flags=0)
                        for (i=0; i<sample_count, i++){
                                    unsigned int(2) pic_type;
                                    unsigned int(6) dependency_level;
                        }
            else
                        for (i=0; i<sample_count, i++){
                                    unsigned int(3) pic_type;
                                    unsigned int(5) dependency_level;
                        }
}
```

FIG. 16

```
aligned(8) class TrickPlayBox
            extends Fullbox('trikhvc', version=0, flags=0)
{
        for (i=0; i<sample_count, i++){
                    unsigned int(4) pic_type;
                    unsigned int(2) temporal_sub_layer_pic_type;
                    unsigned int(3) max_temporal_id;
                    unsigned int(3) temporal_id;
                    unsigned int(3) constraint_trick_play_mode;
                    unsigned int(1) reserved;
                    if (temporal_sub_layer_pic_type = 'TSA'){
                                    unsigned int(3) next_temporal_id;
                                    unsigned int(5) reserved;
                    }
                    else if (temporal_sub_layer_pic_type = 'STSA'){
                                    unsigned int(3) next_temporal_id;
                                    unsigned int(5) reserved;
                    }
        }
}
```

FIG. 17

```
aligned(8) class TrickPlayBox
            extends Fullbox('trik', version=0, flags)
{
            if (flags=0)
                        for (i=0; I<sample_count, i++){
                                    unsigned int(2) pic_type;
                                    unsigned int(6) dependency_level;
                        }
            else
                        for (i=0; I<sample_count, i++){
                                    unsigned int(4) pic_type;
                                    unsigned int(2) temporal_sub_layer_pic_type;
                                    unsigned int(3) max_temporal_id;
                                    unsigned int(3) temporal_id;
                                    unsigned int(3) constraint_trick_play_mode;
                                    unsigned int(1) reserved;
                                    if (temporal_sub_layer_pic_type = 'TSA'){
                                                unsigned int(3) next_temporal_id;
                                                unsigned int(5) reserved;
                                    }
                                    else if (temporal_sub_layer_pic_type = 'STSA'){
                                                unsigned int(3) next_temporal_id;
                                                unsigned int(5) reserved;
                                    }
                        }
            }
```

FIG. 20

```
aligned(8) class TrickPlayBox
            extends Fullbox('trikhvc', version=0, flags=0)
{
            for (i=0; I<sample_count, i++){
                        unsigned int(4) pic_type;
                        unsigned int(2) temporal_sub_layer_pic_type;
                        unsigned int(3) max_temporal_id;
                        unsigned int(3) temporal_id;
                        if (temporal_sub_layer_pic_type = 'TSA'){
                                    unsigned int(3) next_temporal_id;
                                    unsigned int(5) reserved;
                        }
                        else if (temporal_sub_layer_pic_type = 'STSA'){
                                    unsigned int(3) next_temporal_id;
                                    unsigned int(5) reserved;
                        }
                        unsigned int(6) dependency_level;
            }
}
```

FIG. 21

```
aligned(8) class TrickPlayBox
            extends Fullbox('trik', version=0, flags)
{
            if(flags=0)
                        for (i=0; I<sample_count, i++){
                                    unsigned int(2) pic_type;
                                    unsigned int(6) dependency_level;
                        }
            else
                        for (i=0; I<sample_count, i++){
                                    unsigned int(4) pic_type;
                                    unsigned int(2) temporal_sub_layer_pic_type;
                                    unsigned int(3) maxtemporal_id;
                                    unsigned int(3) temporal_id;
                                    if (temporal_sub_layer_pic_type = 'TSA'){
                                                unsigned int(3) next_temporal_id;
                                                unsigned int(5) reserved;
                                    }
                                    else if (temporal_sub_layer_pic_type = 'STSA'){
                                                unsigned int(3) next_temporal_id;
                                                unsigned int(5) reserved;
                                    }
                                    unsigned int(6) dependency_level;
                        }
}
```

| nuh_temporal_id_plus1 | tier |
|---|---|
| 1 | 1 |
| 2 | 2 |
| 3 | 3 |
| 4 | 4 |

| nuh_temporal_id_plus1 | tier |
|---|---|
| 1 | 1 |
| 2 | 2 |
| 3 | 3 |
| 4 | 6 |

FIG. 31

| data_field_tag | Description |
|---|---|
| 0 x 00 | Reserved |
| 0 x 01 | Announcement switching data field |
| 0 x 02 | AU_information data field |
| 0 x 03 | PVR_assist_information data field |
| 0 x 04 | TSAP time line data field |
| 0 x 05 | HEVC temporal id tier mapping info data field |
| 0 x 06 to 0x9F | Reserved for future use |
| 0 x A0 to 0xFF | User defined |

FIG. 32

| Syntax | No. of bits | Format |
|---|---|---|
| HEVC_temporal_id_tier_mapping_info (payloadSize) { | | |
| reserved | 6 | |
| included_temporal_id_flag | 1 | |
| temporal_sub_layer_dependency_flag | 1 | |
| if(included_temporal_id_flag & temporal_sub_layer_dependency_flag){ | | |
|     max_temporal_id_plus1 | 3 | |
|     temporal_id_plus1 | 3 | |
|     reserved | 2 | |
|     if(max_temporal_id_plus1 > 1){ | | |
|         for(i=0; i<max_temporal_id_plus1 − 1; i++){ | 3 | |
|             curr_tier_num | 3 | |
|             trick_play_speed | 2 | |
|             reserved | | |
|         } | | |
|     } | | |
| } | | |

FIG. 33

| trick play speed | Providable X speed |
|---|---|
| 0 | 1 |
| 1 | 2 |
| 2 | 4 |
| 3 | 8 |
| 4 | 16 |
| 5 | 32 |
| 6 | 64 |

FIG. 34

| Syntax | No. bits | Mnemonic |
|---|---|---|
| PVR_assist_information( ) { | | |
|   data_field_tag | 8 | uimsbf |
|   data_field_length | 8 | uimsbf |
|   if (data_field_length > 0) { | | |
|     PVR_assist_tier_pic_num | 3 | uimsbf |
|     PVR_assist_block_trick_mode_present_flag | 1 | bsibf |
|     PVR_assist_pic_struct_present_flag | 1 | bsibf |
|     PVR_assist_tier_next_pic_in_tier_present_flag | 1 | bsibf |
|     PVR_assist_substream_info_present_flag | 1 | bsibf |
|     PVR_assist_extension_present_flag | 1 | bsibf |
|     if(PVR_assist_extension_present_flag == "1"){ | | |
|       PVR_assist_segmentation_info_present_flag | 1 | bsibf |
|       PVR_assist_tier_m_cumulative_frames_present_flag | 1 | bsibf |
|       PVR_assist_tier_n_mmco_present_flag | 1 | bsibf |
|       PVR_assist_reserved_0 | 5 | "00000" |
|       if(PVR_assist_segmentation_info_present_flag == "1"){ | | |
|         PVR_assist_seg_id | 8 | uimsbf |
|         PVR_assist_prg_id | 16 | uimsbf |
|         PVR_assist_seg_start_flag | 1 | bsibf |
|         PVR_assist_seg_end_flag | 1 | bsibf |
|         PVR_assist_prg_start_flag | 1 | bsibf |
|         PVR_assist_prg_stop_flag | 1 | bsibf |
|         PVR_assist_scene_change_flag | 1 | bsibf |
|         PVR_assist_reserved_0 | 3 | "000" |
|       } | | |
|       if(PVR_assist_tier_m_cumulative_frames_present_flag == "1"){ | | |
|         PVR_assist_tier_m | 3 | uimsbf |
|         PVR_assist_tier_m_cumulative_frames | 5 | uimsbf |
|       } | | |
|       if(PVR_assist_tier_n_mmco_present_flag == "1") { | | |
|         PVR_assist_tier_n_mmco | 3 | uimsbf |
|         PVR_assist_reserved_0 | 5 | "00000" |
|       } | | |
|     } | | |
|   } | | |
| } | | |

FIG. 35

| Syntax | No. bits | Mnemonic |
|---|---|---|
| PVR_assist_information( ) { | | |
|     data_field_tag | 8 | uimsbf |
|     data_field_length | 8 | uimsbf |
|     if (data_field_length > 0) { | | |
|         PVR_assist_tier_pic_num | 3 | uimsbf |
|         PVR_assist_temporal_id_plus1 | 3 | uimsbf |
|         PVR_assist_block_trick_mode_present_flag | 1 | bsibf |
|         PVR_assist_pic_struct_present_flag | 1 | bsibf |
|         PVR_assist_tier_next_pic_in_tier_present_flag | 1 | bsibf |
|         PVR_assist_substream_info_present_flag | 1 | bsibf |
|         PVR_assist_extension_present_flag | 1 | bsibf |
|         PVR_assist_temporal_id_info_present_flag | 1 | bsibf |
|         if (PVR_assist_temporal_id_info_present_flag == "1") { | | |
|             PVR_assist_max_temporal_id_plus1 | 3 | uimsbf |
|         } | | |
|     } | | |
| } | | |

FIG. 36

| Syntax | No. bits | Mnemonic |
|---|---|---|
| PVR_assist_information( ) { | | |
|     data_field_tag | 8 | uimsbf |
|     data_field_tag | 8 | uimsbf |
|     if (data_field_length > 0) { | | |
|         PVR_assist_tier_pic_num | 3 | uimsbf |
|         PVR_assist_tier_pic_num_to_temporal_id_flag | 3 | bsibf |
|         PVR_assist_block_trick_mode_present_flag | 1 | bsibf |
|         PVR_assist_pic_struct_present_flag | 1 | bsibf |
|         PVR_assist_tier_next_pic_in_tier_present_flag | 1 | bsibf |
|         PVR_assist_substream_info_present_flag | 1 | bsibf |
|         PVR_assist_extension_present_flag | 1 | bsibf |
|         PVR_assist_temporal_id_info_present_flag | 1 | bsibf |
| | | |
|         if (PVR_assist_tier_pic_num_to_temporal_id_flag == 1 && PVR_assist_temporal_id_info_present_flag == "1") { | | |
|             PVR_assist_max_temporal_id_plus1 | 3 | uimsbf |
|         } | | |
|     } | | |
| } | | |

FIG. 37

| Syntax | No. bits | Mnemonic |
|---|---|---|
| PVR_assist_information( ) { | | |
| data_field_tag | 8 | uimsbf |
| data_field_length | 8 | uimsbf |
| if (data_field_length > 0) { | | |
|    PVR_assist_temporal_id_plus1 | 3 | uimsbf |
|    PVR_assist_substream_info_present_flag | 1 | bsibf |
|    PVR_assist_extension_present_flag | 1 | bsibf |
|    PVR_assist_temporal_id_present_flag | 1 | bsibf |
|    PVR_assist_temporal_sub_layer_dependency_flag | 1 | bsibf |
|    if (PVR_assist_temporal_id_present_flag == "1" && PVR_assist _temporal_sub_layer_dependency_flag == "1") { | | |
|       PVR_assist_max_temporal_id_plus1 | 3 | uimsbf |
|       If(PVR_assist_max_temporal_id_plus1 > 1) { | | |
|          for(i=0; i<PVR_assist_max_temporal_id_plus1 − 1; i++) { 3 | | |
|             PVR_assist_curr_tier_num | 3 | uimsbf |
|             PVR_assist_trick_play_speed | 3 | uimsbf |
|             PVR_assist_reserved_0 | 2 | "00" |
|          } | | |
|       } | | |
|    } | | |
| } | | |
| } | | |

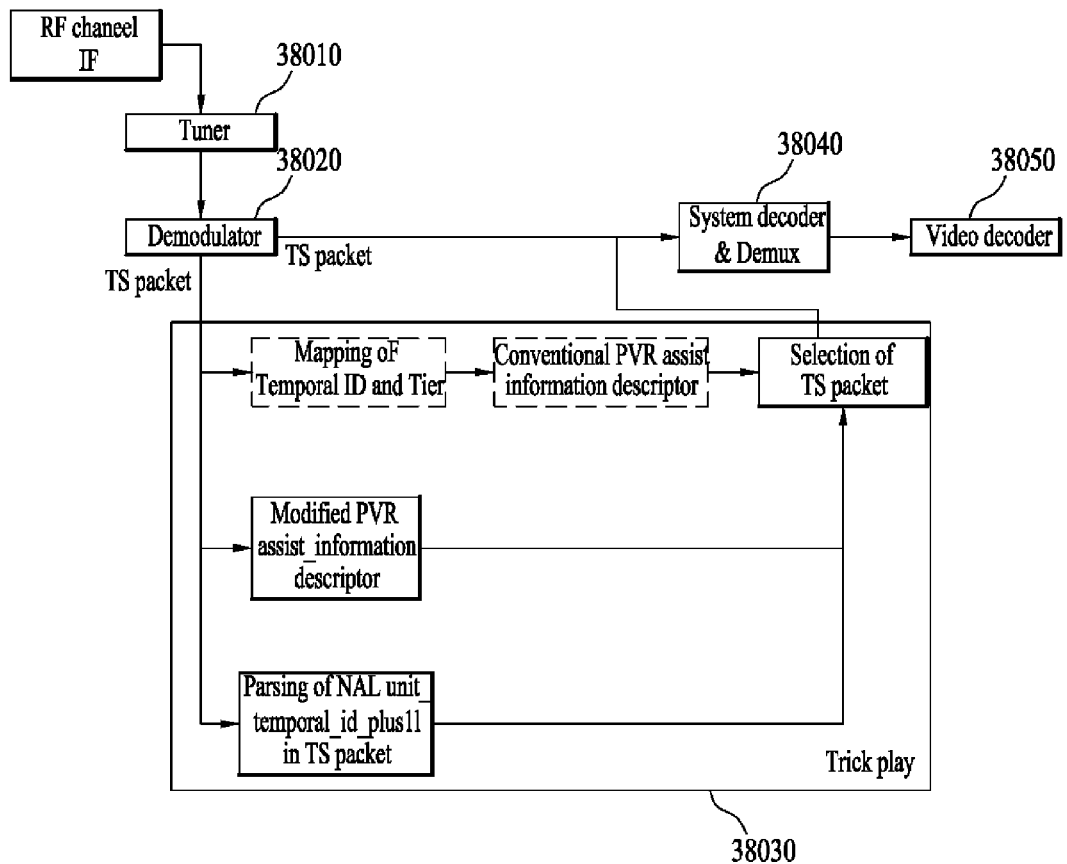

FIG. 40

| Syntax | No. bits | Mnemonic |
|---|---|---|
| PVR_assist_information( ) { | | |
|     data_field_tag | 8 | uimsbf |
|     data_field_length | 8 | uimsbf |
|     if (data_field_length > 0) { | | |
|         ……… | | |
|         PVR_assist_temporal_id_plus1 | 3 | uimsbf |
|         PVR_assist_temporal_id_info_present_flag | 1 | bsibf |
|         PVR_assist_intra_picture_flag | 1 | bsibf |
|         PVR_assist_reserved_0 | 3 | "000" |
|         If(PVR_assist_temporal_id_info_present_flag == "1") { | | |
|             PVR_assist_max_temporal_id_plus1 | 3 | uimsbf |
|             PVR_assist_PB_numbers_in_temporalId_zero | 3 | uimsbf |
|             PVR_assist_reserved_0 | 2 | "00000" |
|         } | | |
|         for (i=0; i<n; i++) + { | | |
|             PVR_assist_reserved_byte | 8 | uimsbf |
|         } | | |
|     } | | |
| } | | |

METHOD AND APPARATUS FOR TRANSMITTING AND RECEIVING BROADCAST SIGNAL FOR PROVIDING TRICK PLAY SERVICE

CROSS REFERENCE TO RELATED APPLICATIONS

This application is the National Phase of PCT International Application No. PCT/KR2014/011042, filed on Nov. 18, 2014, which claims priority under 35 U.S.C. 119(e) to U.S. Provisional Application Nos. 61/910,416 filed on Dec. 1, 2013, 61/952,140 filed on Mar. 13, 2014, 61/954,615 filed on Mar. 18, 2014 and 61/970,910 filed on Mar. 27, 2014, all of which are hereby expressly incorporated by reference into the present application.

TECHNICAL FIELD

The present invention relates to transmission and reception of a broadcast signal. More particularly, the present invention relates to a method and apparatus for transmitting and receiving a broadcast signal for providing a trick play service.

BACKGROUND ART

In recent years, demand for and interest in a high-resolution, high-quality image service is very high. As an ultra high definition TV (UHDTV) following a HDTV has come into the market, a very realistic high-resolution, high-quality broadcast service is being provided. In a mobile market, a smart phone having an HD level basic screen resolution has also come into the market and, as a result, users' demand for a high-resolution, high-quality image is rapidly increasing. H.264/advanced video coding (AVC) standards used now in various multimedia devices, such as a DTV, a DMB, a DVD, a digital camcorder, an image black box, an IPTV, a smart TV, and a smart phone, are limited in supporting a high-resolution, high-quality image service. For this reason, ITU-T Video Coding Experts Group (VCEG) and ISO/IEC Moving Picture Experts Group (MPEG) have started to standardize high efficiency video coding (HEVC) according to the necessity of a new next generation moving picture compression standard having a higher compression rate and a lower complexity than H.264/AVC and completed Final Draft International Standard (FDIS) of HEVC. HEVC is a next generation image compression standard exhibiting coding efficiency equivalent to about 35% that of H.264/AVC and has attracted considerable attention as a core technology for effectively compressing huge data of HD level images and UHD level images. It is prospected that optimized HEVC software and hardware standards will come into the market through efforts for commercialization of HEVC technology all over the world.

Meanwhile, a trick play means a service providing a function that is capable of reproducing an image after a random time, i.e. enabling random access, and an X speed function, such as an X2 speed and an X4 speed. Since there is a difference between a random access point of HEVC and a random access point of H.264, it is necessary to newly define a category of the random access point of HEVC. In addition, HEVC provides scalability and, therefore, it is necessary to provide a trick play using the same. Furthermore, a conventional CFF media file format specification defines a format for a trick play of H.264/AVC. However, content encoded by HEVC is not defined. Consequently, it is necessary to provide a new format for decoding and a trick play of content encoded by HEVC.

For execution of a trick play, pictures constituting a video stream are classified using a concept of a tier according to dependency between the respective pictures in a conventional AVC/H.264 base. A receiving side decodes and displays only pictures having a specific tier value to provide a trick play. Since HEVC basically provides temporal scalability of a video stream, however, it is necessary to study a method of providing a trick play service using temporal scalability. Moreover, if a user knows providable maximum X speed information, the user may feel convenience in using a trick play. Consequently, it is necessary to study a method of providing providable maximum X speed information to the user.

DISCLOSURE

Technical Problem

An object of the present invention devised to solve the problem lies on a method and/or apparatus for transmitting and receiving a broadcast signal for providing a trick play service.

Another object of the present invention devised to solve the problem lies on information related to a trick play for providing a trick play service.

Another object of the present invention devised to solve the problem lies on a method of signaling information related to a trick play.

Another object of the present invention devised to solve the problem lies on a signaling method that is capable of providing maximum X speed information to a user.

Another object of the present invention devised to solve the problem lies on a method of providing a trick play using temporal scalability basically provided by HEVC.

A further object of the present invention devised to solve the problem lies on a method of providing a better trick play service while maximally using conventional information related to a trick play as it is.

Technical Solution

The object of the present invention can be achieved by providing a broadcast signal transmitting method including encoding video data to create a video elementary stream (ES), creating a packetized elementary stream (PES) including the video elementary stream (ES), creating a transport stream (TS) including the created PES, wherein the TS includes PVR assist information for executing a trick play, the PVR assist information includes tier number information and maximum temporal identification information, and the tier number information indicates a tier number having a value obtained by adding 1 to a temporal identification information value of a picture different from a RAP picture and the maximum temporal identification information indicates a maximum temporal identification information value of the video elementary stream (ES) including the encoded video data, and transmitting the created TS.

The tier number indicated by the tier number information may have a value of 0 for the RAP picture.

The maximum temporal identification information may be used to provide information regarding speed of the trick play.

The PVR assist information may be included in an adaptation field of the TS.

The PVR assist information may include segmentation info flag information indicating existence or nonexistence of information regarding a segment to which a picture belongs.

The PVR assist information may include segment identifier information indicating an id of a segment to which a picture belongs.

The PVR assist information may include program identifier information indicating an id of a program to which a picture belongs.

The PVR assist information may include at least one selected from between segment start flag information for identifying a picture having a first presentation order in each segment and segment end flag information for identifying a picture having a last presentation order in each segment.

The PVR assist information may include at least one selected from between program start flag information for identifying a picture having a first presentation order in each program and program end flag information for identifying a picture having a last presentation order in each program.

In another aspect of the present invention, provided herein is a broadcast signal receiving apparatus including a tuner for receiving a transport stream (TS), wherein the TS includes PVR assist information for executing a trick play, the PVR assist information includes tier number information and maximum temporal identification information, and the tier number information indicates a tier number having a value obtained by adding 1 to a temporal identification information value of a picture different from a RAP picture and the maximum temporal identification information indicates a maximum temporal identification information value of a video elementary stream (ES) including encoded video data, a first extraction unit for extracting a packetized elementary stream (PES) from the received TS, a second extraction unit for extracting a video elementary stream (ES) from the extracted PES, and a decoder for decoding the extracted video elementary stream (ES).

The tier number indicated by the tier number information may have a value of 0 for the RAP picture.

The maximum temporal identification information may be used to provide information regarding speed of the trick play.

The PVR assist information may be included in an adaptation field of the TS.

The PVR assist information may include segmentation info flag information indicating existence or nonexistence of information regarding a segment to which a picture belongs.

The PVR assist information may include segment identifier information indicating an id of a segment to which a picture belongs.

The PVR assist information may include program identifier information indicating an id of a program to which a picture belongs.

The PVR assist information may include at least one selected from between segment start flag information for identifying a picture having a first presentation order in each segment and segment end flag information for identifying a picture having a last presentation order in each segment.

The PVR assist information may include at least one selected from between program start flag information for identifying a picture having a first presentation order in each program and program end flag information for identifying a picture having a last presentation order in each program.

Advantageous Effects

The present invention has the effect of providing a trick play service to a user.

The present invention has the effect of providing information related to a trick play for providing a trick play service to a user.

The present invention has the effect of providing a method of signaling providing information related to a trick play to a user.

The present invention has the effect of providing providable maximum X speed information to a user in a trick play service.

The present invention has the effect of providing a more efficient trick play service using temporal scalability of HEVC.

The present invention has the effect of providing a more efficient trick play service while maximally maintaining a conventional system related to a trick play service.

The present invention has the effect of providing a trick play service using the structure of an HEVC video stream as it is.

The present invention has the effect of providing a trick play service using a temporal ID-based structure of an HEVC video stream, thereby providing a higher encoding speed without necessity of signaling a specific picture which will be used in a trick play at an encoding step.

DESCRIPTION OF DRAWINGS

FIG. 1 is a view showing a trick play method according to an embodiment of the present invention based on scenarios.

FIG. 2 is a view showing a Common File Format (CFF) box structure for supporting an HEVC-based stream according to an embodiment of the present invention.

FIG. 3 is a view showing syntax of an "hvcn" box according to an embodiment of the present invention.

FIG. 4 is a view showing an element supporting a High Dynamic Range (HDR) included in Common_Metadata according to an embodiment of the present invention.

FIG. 5 is a view showing a picture type for random access in a case of an HEVC stream according to an embodiment of the present invention.

FIG. 10 is a view showing the configuration of a trick play box for supporting a trick play of an HEVC stream having a max_temporal_id of 0 according to an embodiment of the present invention (scenario 1-2).

FIG. 11 is a view showing the configuration of a trick play box for supporting a trick play of an HEVC stream having a max_temporal_id of 0 according to another embodiment of the present invention (scenario 1-2).

FIG. 12 is a view showing the description of pic_type included in a trick play box for supporting a trick play of an HEVC stream having a max_temporal_id of 0 according to an embodiment of the present invention.

FIG. 13 is a view showing the configuration of a trick play box for supporting a trick play of an HEVC stream having a max_temporal_id of 0 in a case in which pic_type does not include contents related to a leading picture according to an embodiment of the present invention (scenario 1-1).

FIG. 16 is a view showing the configuration of a trick play box for restricting the maximum X speed to support a trick play in an HEVC stream supporting temporal scalability according to an embodiment of the present invention (scenario 2).

FIG. 17 is a view showing the configuration of a trick play box for restricting the maximum X speed to support a trick play in an HEVC stream supporting temporal scalability according to another embodiment of the present invention (scenario 2).

FIG. 20 is a view showing the configuration of a trick play box for supporting a high X speed trick play in an HEVC stream supporting temporal scalability according to an embodiment of the present invention (scenario 3).

FIG. 21 is a view showing the configuration of a trick play box for supporting a high X speed trick play in an HEVC stream supporting temporal scalability according to another embodiment of the present invention.

FIG. 31 is a view showing the configuration of an adaptation field of a TS packet including information for mapping of a temporal id and a tier according to an embodiment of the present invention.

FIG. 32 is a view showing the configuration of HEVC_temporal_id_tier_mapping_info according to an embodiment of the present invention.

FIG. 33 is a view showing the configuration of a trick_play_speed field included in HEVC_temporal_id_tier_mapping_info according to an embodiment of the present invention.

FIG. 34 is a view showing the configuration of PVR_assist_information according to an embodiment of the present invention.

FIG. 35 is a view showing the configuration of PVR_assist_information having a temporal id frame work added thereto according to an embodiment of the present invention (scenario B-a-a).

FIG. 36 is a view showing the configuration of PVR assist information having a temporal id frame work added thereto according to another embodiment of the present invention (scenario B-a-b).

FIG. 37 is a view showing the configuration of PVR_assist_information for supporting a trick play using a temporal id according to an embodiment of the present invention (scenario B-b).

FIG. 38 is a view showing a receiving apparatus according to an embodiment of the present invention.

FIG. 39 is a view showing comparison between a tier framework and an HEVC temporal sub-layer according to an embodiment of the present invention.

FIG. 40 is a view showing the configuration of PVR_assist_information according to another embodiment of the present invention.

BEST MODE

Figure 6:
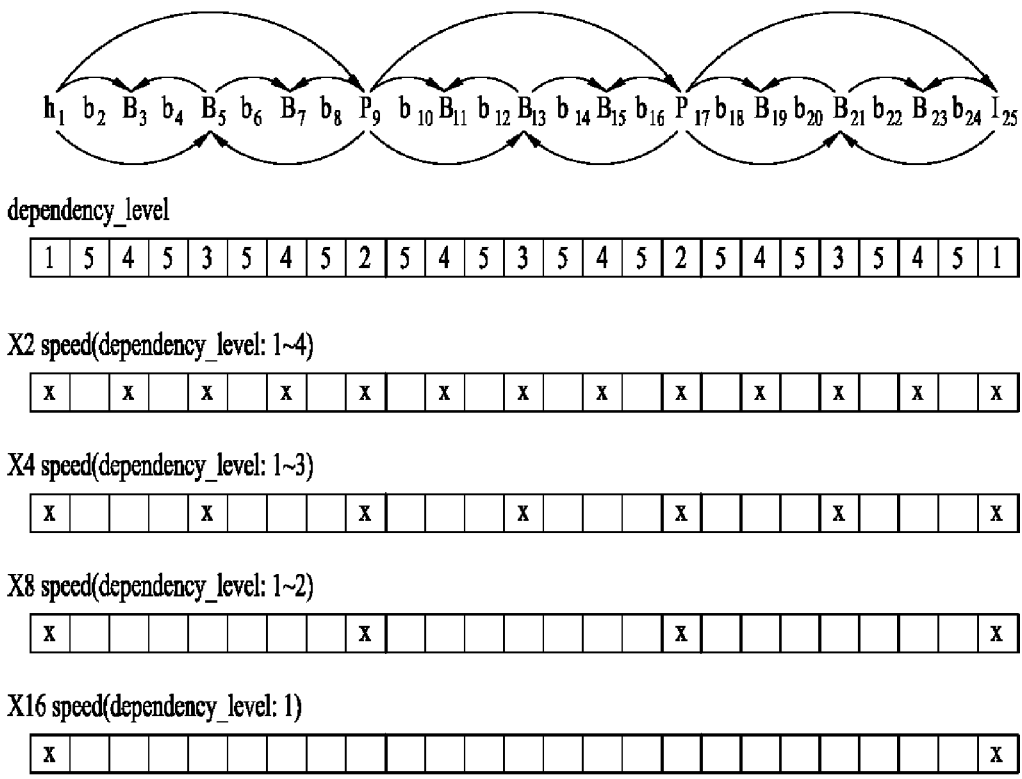
FIG. 6 is a view showing a trick play method in a case of a closed GOP according to an embodiment of the present invention (scenario 1-1).

Reference will now be made in detail to the preferred embodiments, examples of which are illustrated in the accompanying drawings. It should be noted herein that these embodiments are only for illustrative purposes and the protection scope of the present specification is not limited or restricted thereto.

Terms used in present specification are general terms selected in consideration of functions and widely used at the present time. However, such terms may vary depending upon intentions of those skilled in the art to which the present specification pertains, usual practices, or appearance of new technology. In a specific case, some terms may be selected by the applicant of the present application. In this case, meanings of such terms will be described in corresponding paragraphs of present specification. Therefore, it should be noted that terms used in present specification be interpreted based on real meanings of the terms and the present specification, not simple names of the terms.

For easy understanding of the present invention and the convenience of description, terms and abbreviations are defined as follows.

High Efficiency Video Coding (HEVC) is a high efficiency video coding standard providing the same video quality as a conventional H.265/AVC technology while having a compression rate about twice higher than that of the H.265/AVC technology.

Temporal scalability means a method of coding frames having different frame frequencies in the same spatial resolution A trick play means a function that is capable of reproducing an image after a random time, i.e. enabling random access, and providing an X speed function.

An Open GOP means a structure that is capable of encoding a picture in one GOP using a picture located before the corresponding GOP as a reference picture, i.e. an GOP including a leading picture.

A Closed GOP means a structure for encoding a picture in one GOP using only a picture in the corresponding GOP as a reference picture, i.e. an GOP not including a leading picture unlike the Open GOP.

The leading picture means a picture in HEVC having a later decoding order but an earlier reproduction order than IRAP.

Temporal id is a term introduced to support temporal scalability in HEVC and may be signaled by nuh_temporal_id_plus1 of NAL_unit_header.

Tier is a term introduced to support a trick play in an AVC stream or an mpeg-2 stream and may be included in an adaptation field in a TS packet.

FIG. 1 is a view showing a trick play method according to an embodiment of the present invention based on scenarios.

According to an embodiment of the present invention, a signaling method for a trick play may be defined based on whether to use temporal scalability of HEVC.

In a case in which a video stream according to an embodiment of the present invention is a stream which does not provide temporal scalability, i.e. in a case in which the video stream includes only a picture having a temporal_id of 0, for a Closed GOP, dependency_level and pic_type defined in a CFF media file format may be signaled to provide a trick play since the video stream does not include a leading picture (scenario 1-1). On the other hand, for an Open GOP, leading picture type may be included in pic_type and dependency_level may be signaled to provide a trick play (scenario 1-2).

In a case in which a video stream according to an embodiment of the present invention is a stream based on temporal scalability, i.e. in a case in which the video stream includes a picture having a temporal_id of more than 0, dependency_level, pic_type, and temporal_sub_layer_pic_type may be signaled to provide a trick play. More specifically, a supportable speed level may be signaled through temporal_id included in the stream to provide a trick play (scenario 2). In addition, a supportable X speed level may be signaled through temporal_id in the same manner as in scenario 2 and a picture having a temporal_id of 0 may be additionally used to provide an additional service for X speed (scenario 3).

A box shown in this figure may indicate a picture constituting a video stream and T_ID described in the box may mean temporal_id for supporting temporal scalability.

FIG. 2 is a view showing a Common File Format (CFF) box structure for supporting an HEVC-based stream according to an embodiment of the present invention.

In this figure, NL0", "NL1", and "NL2" may indicate an inclusion relationship of CFF boxes, "Format Req." may indicate existence or nonexistence of corresponding boxes and the number of the corresponding boxes, "Specification" may indicate a portion of standards defining the corresponding boxes, and "Description" may indicate the description of the corresponding boxes. In a case in which "Format Req." is "+", it may mean that one or more corresponding boxes exist. In a case in which "Format Req." is "0/1", it may mean that a corresponding box exists or does not exist. In a case in which "Format Req." is "1", it may mean that a corresponding box exists. In a case in which "Format Req." is "0", it may mean that a corresponding box does not exist.

This figure shows a CFF box structure according to an embodiment of the present invention in which a new trick play box for HEVC is added to a conventional CFF. In addition, a CFF box structure according to an embodiment of the present invention may include a storage box abbreviated to "hvcn" for supporting an HEVC-based nal unit.

FIG. 3 is a view showing syntax of an "hvcn" box according to an embodiment of the present invention.

According to an embodiment of the present invention, a CFF box structure may include a nal unit storage box abbreviated to "hvcn".

According to an embodiment of the present invention, the nal unit storage box may be defined per codec for a trick play.

According to an embodiment of the present invention, the nal unit storage box may not be defined per codec for a trick play and a HEVC trick box different from a conventional AVC trick box may be defined in a conventional "trick" box. In addition, AVC or a HEVC trick play may be selected according to a flag of the "trick" box.

In this figure, HEVCConfig may include a Sequence Parameter Set (SPS) and a Picture Parameter Set (PPS) of HEVC and video information, such as a VUI parameter, of the SPS.

FIG. 4 is a view showing an element supporting a High Dynamic Range (HDR) included in Common_Metadata according to an embodiment of the present invention.

Common_Metadata referred to by an xml box according to an embodiment of the present invention may include a HighDynamicRange element.

A HighDynamicRange element according to an embodiment of the present invention may have a value of string according to an xml schema. One HighDynamicRange element may exist or no HighDynamicRange element may exist.

A HighDynamicRange element according to an embodiment of the present invention may indicate the minimum luminance and/or the maximum luminance (min.luminance and/or max.luminance).

A HighDynamicRange element according to an embodiment of the present invention may profile values classified by the minimum luminance and/or the maximum luminance. For example, the HighDynamicRange element may indicate Conventional capacity (min: 0.1 cd/m2, max: 100 cd/m2), Mid capacity (min: 0.001 cd/m2, max: 1000 cd/m2), or High capacity (min: 0.0001 cd/m2, max: 10000 cd/m2).

FIG. 5 is a view showing a picture type for random access in a case of an HEVC stream according to an embodiment of the present invention.

This figure shows a picture type which may be the base for random access and execution of a trick play among HEVC NAL unit types.

A shaded picture type (TSA, STSA) in this figure may indicate an HEVC temporal sub-layer picture type which may be used for a trick play in a case in which a stream having a temporal ID of more than 0 is included, i.e. temporal scalability is provided. The shaded picture type may be used scenarios 2 and 3 according to an embodiment of the present invention.

According to an embodiment of the present invention, random access point pictures may include an Instantaneous Decoding Refresh (IDR) picture, a Broken Link Access (BLA) picture, and/or a Clean Random Access (CRA) picture, leading pictures may include a Random Access Decodable Leading (RADL) picture and/or a Random Access Skipped Leading (RASL) picture, and temporal sub-layer access pictures may include a Temporal Sub-layer Access (TSA) picture and/or a Step-wise Temporal Sub-layer Access (STSA) picture.

The Instantaneous Decoding Refresh (IDR) picture may include a case in which the IDR picture has a related leading picture and/or a case in which the IDR picture does not have a related leading picture.

The Broken Link Access (BLA) picture may include a case in which the BLA picture has a related RADL picture but does not have a related RASL picture and/or a case in which the BLA picture does not have a related leading picture.

The Clean Random Access (CRA) picture may include a case in which the CRA picture has a related leading picture.

The Temporal Sub-layer Access (TSA) picture may include a case in which the TSA picture is not referred to by the same sub-layer and/or a case in which the TSA picture is referred to by the same sub-layer.

The Step-wise Temporal Sub-layer Access (STSA) picture may include a case in which the STSA picture is not referred to by the same sub-layer and/or a case in which the STSA picture is referred to by the same sub-layer.

FIG. 6 is a view showing a trick play method in a case of a closed GOP according to an embodiment of the present invention (scenario 1-1).

This figure shows a method of executing a trick play in a case in which a maximum temporal_id in a video stream is 0 and in a case of a closed GOP. A GOP is short for a Group Of Pictures and indicates a group of coded pictures for enabling random access. A closed GOP may mean a GlOP which does not include a leading picture and an Open GOP may mean a GlOP which includes a leading picture. The leading picture may indicate a picture in HEVC having a later decoding order but an earlier display order than an Intra Random Access Point (TRAP) (the same concept as a random access point in AVC codec).

In this figure, one quadrilateral box may indicate one picture. A picture may be used as the same meaning as a frame and/or an image.

In this figure, a group of pictures I1 to P9 may indicate one GOP. Picture I, which is one of three picture types used for a MPEG coding signal, may include all data constituting one complete picture. That is, picture I may not refer to other pictures. Picture P may include only a difference value between estimated information obtained by observing a difference between a current picture and the previous picture in presentation order and real information. That is, picture P may refer to a picture existing before a current picture in presentation order. Picture B may include only estimated information obtained by observing a difference among a current picture, the previous picture, and the next picture in presentation order. That is, picture B may refer to pictures existing before and after a current picture. Arrows indicated in this figure may indicate reference among pictures. For example, picture B3 may refer to picture I1 and picture B5 to make a complete picture and picture P9 may refer to picture I1.

In this figure, numbers in the boxes may indicate a dependency_level of each picture. For example, a first picture may indicate a picture having a dependency_level of 1, a second picture may indicate a picture having a dependency_level of 5, and a third picture may indicate a picture having a dependency_level of 4.

According to an embodiment of the present invention, an X2 speed trick play may be executed by decoding pictures having a dependency_level value of 1 to 4. An X4 speed trick play may be executed by decoding pictures having a dependency_level value of 1 to 3. An X8 speed trick play may be executed by decoding pictures having a dependency_level value of 1 or 2. An X16 speed trick play may be executed by decoding pictures having a dependency_level value of 1.

Figure 7:
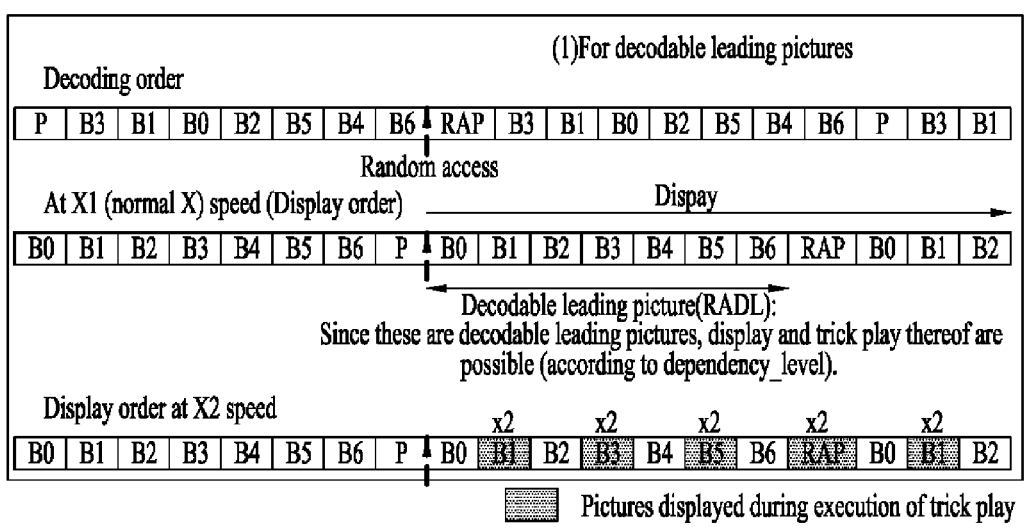
FIG. 7 is a view showing a trick play method in a case of an open GOP wherein the GOP includes a decodable leading picture according to an embodiment of the present invention (scenario 1-2).

FIG. 7 is a view showing a trick play method in a case of an open GOP wherein the GOP includes a decodable leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second figure part, marked pictures B0 to B6 may indicate a decodable leading picture.

Since the leading picture included in the GOP is a decodable leading picture in this figure, pictures may be displayed from a portion indicated by an arrow as shown in the second figure part and a trick play may be executed as shown in the third figure part. In a case in which an X2 speed trick play is executed, pictures B1, B3, B5, RAP, and B1 may be displayed according to a dependency_level of each picture as shown in the figure. A decodable leading picture may include a Random Access Decodable Leading (RADL) picture.

Figures 8, 9:
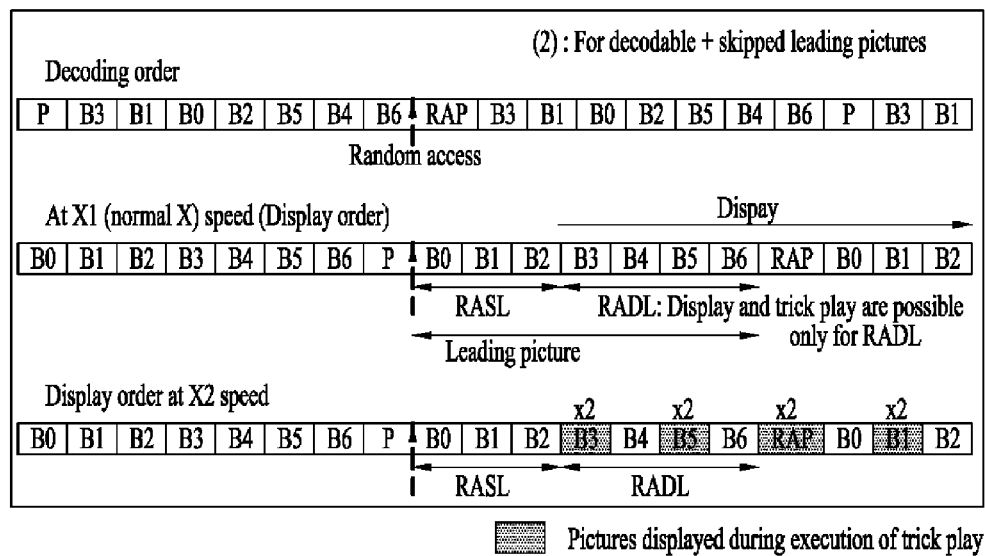
FIG. 8 is a view showing a trick play method in a case of an open GOP wherein the GOP includes a decodable leading picture and a skipped leading picture according to an embodiment of the present invention (scenario 1-2).
FIG. 9 is a view showing a trick play method in a case of an open GOP wherein the GOP includes a skipped leading picture according to an embodiment of the present invention (scenario 1-2).

FIG. 8 is a view showing a trick play method in a case of an open GOP wherein the GOP includes a decodable leading picture and a skipped leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second and third figure parts, marked pictures B0 to B2 may indicate a skipped leading picture and marked pictures B3 to B6 may indicate a decodable leading picture.

In this figure, a skipped leading picture may not be displayed and a trick play may not be executed. Consequently, pictures may be displayed from picture B3 as shown in the second figure part and a trick play may be executed from picture B3 as shown in the third figure part. In a case in which an X2 speed trick play is executed, pictures B3, B5, RAP, and B1 may be displayed according to a dependency_level of each picture as shown in the figure. A decodable leading picture may include a Random Access Decodable Leading (RADL) picture and a skipped leading picture may include a Random Access Skipped Leading (RASL) picture.

FIG. 9 is a view showing a trick play method in a case of an open GOP wherein the GOP includes a skipped leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second and third figure parts, marked pictures B0 to B6 may indicate a skipped leading picture.

In this figure, a skipped leading picture may not be displayed and a trick play may not be executed. Consequently, pictures may be displayed from picture RAP as shown in the second figure part and pictures RAP and B1 may be displayed as shown in the third figure part in a case in which an X2 speed trick play is executed. A skipped leading picture may include a Random Access Skipped Leading (RASL) picture.

FIG. 10 is a view showing the configuration of a trick play box for supporting a trick play of an HEVC stream having a max_temporal_id of 0 according to an embodiment of the present invention (scenario 1-2).

This figure shows a signaling method of a trick play box for executing a trick play of a stream having a maximum temporal_id of 0.

According to an embodiment of the present invention, a new box "trikhvc" may be defined. A trikhvc box according to an embodiment of the present invention may include a pic_type field and/or a dependency_level field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

FIG. 11 is a view showing the configuration of a trick play box for supporting a trick play of an HEVC stream having a max_temporal_id of 0 according to another embodiment of the present invention (scenario 1-2).

This figure shows a signaling method of a trick play box for executing a trick play of a stream having a maximum temporal_id of 0.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may divide and signal a stream based on video codec using a flag. In addition, the trik box may include a pic_type field and/or a dependency_level field in a for loop repeated by a sample_count value.

In a case in which a value of flag according to an embodiment of the present invention is 0, the trik box may signal an H.264/AVC trick play. In a case in which a value of flag is 1, the trik box may signal an HEVC trick play.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

FIG. 12 is a view showing the description of pic_type included in a trick play box for supporting a trick play of an HEVC stream having a max_temporal_id of 0 according to an embodiment of the present invention.

Pic_type according to an embodiment of the present invention may have a value of 0 to 15.

In a case in which a value of pic_type is 0, pic_type may indicate an IDR picture which does not have a related leading picture. In this case, nal_unit_type may indicate IDR_N_LP.

In a case in which a value of pic_type is 1, pic_type may indicate an IDR picture which has a related decodable leading picture. In this case, nal_unit_type may indicate IDR_W_RADL.

In a case in which a value of pic_type is 2, pic_type may indicate a BLA picture which has a related leading picture. In this case, nal_unit_type may indicate BLA_N_LP.

In a case in which a value of pic_type is 3, pic_type may indicate a BLA picture which has a related RADL picture but does not have a related RASL picture. In this case, nal_unit_type may indicate BLA_W_RADL.

In a case in which a value of pic_type is 4, pic_type may indicate a BLA picture which has a related RADL picture and a related RASL picture. In this case, nal_unit_type may indicate BLA_W_LP.

In a case in which a value of pic_type is 5, pic_type may indicate a CRA picture which has a related leading picture. In this case, nal_unit_type may indicate CRA_NUT.

In a case in which a value of pic_type is 7, pic_type may indicate a Random Access Decodable Leading (RADL) picture. In this case, nal_unit_type may indicate RADL_N or RADL_R.

In a case in which a value of pic_type is 8, pic_type may indicate a Random Access Skipped Leading (RASL) picture. In this case, nal_unit_type may indicate RASL_N or RASL_R.

In a case in which a value of pic_type is 9, pic_type may indicate undecided picture I.

A value of pic_type 10 may correspond to an unknown value.

Values of pic_type 11 to 15 may correspond to reserved values.

FIG. 13 is a view showing the configuration of a trick play box for supporting a trick play of an HEVC stream having a max_temporal_id of 0 in a case in which pic_type does not include contents related to a leading picture according to an embodiment of the present invention (scenario 1-1).

This figure shows a signaling method of a trick play box for executing a trick play of a stream having a maximum temporal_id of 0.

According to an embodiment of the present invention, a new box "trikhvc" may be defined. A trikhvc box according to an embodiment of the present invention may include a pic_type field and/or a dependency_level field in a for loop repeated by a sample_count value.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 3 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 5 bits.

Figures 14, 15:
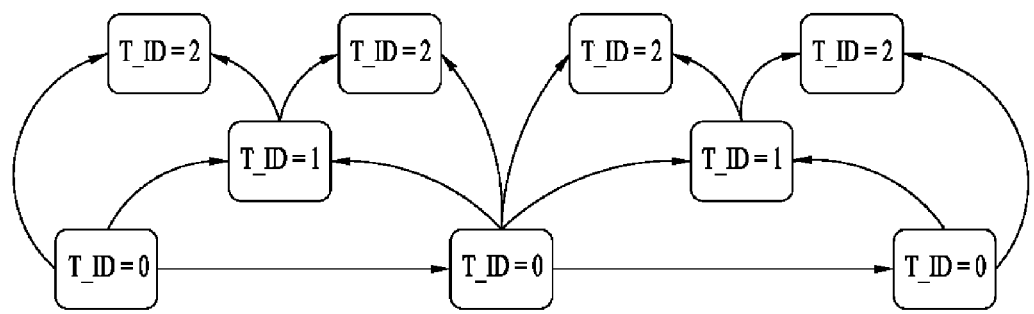
FIG. 14 is a view showing the configuration of a trick play box for supporting a trick play of an HEVC stream having a max_temporal_id of 0 in a case in which pic_type does not include contents related to a leading picture according to another embodiment of the present invention (scenario 1-1).
FIG. 15 is a view showing the configuration of an HEVC stream supporting temporal scalability according to an embodiment of the present invention.

FIG. 14 is a view showing the configuration of a trick play box for supporting a trick play of an HEVC stream having a max_temporal_id of 0 in a case in which pic_type does not include contents related to a leading picture according to another embodiment of the present invention (scenario 1-1).

This figure shows a signaling method of a trick play box for executing a trick play of a stream having a maximum temporal_id of 0.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field and/or a dependency_level field in a for loop repeated by a value of flag and sample_count.

In a case in which a value of flag according to an embodiment of the present invention is 0, the trik box may signal an H.264/AVC trick play. In a case in which a value of flag is 1, the trik box may signal an HEVC trick play.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 3 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. In a case in which a value of flag according to an embodiment of the present invention is 0, the dependency_level field may indicate a value of 6 bits. In a case in which a value of flag is 1, the dependency_level field may indicate a value of 5 bits.

According to another embodiment of the present invention, pic_type may be configured as follows in a case in which a limitation that a leading picture is not displayed during execution of a trick play is included. In a case in which a value of pic_type is 0, pic_type may indicate that a corresponding sample is an unknown sample. In a case in which a value of pic_type is 1, pic_type may indicate that a corresponding sample is an IDR sample. In a case in which a value of pic_type is 2, pic_type may indicate that a corresponding sample is a CRA sample. In a case in which a value of pic_type is 3, pic_type may indicate that a corresponding sample is a BLA sample. In a case in which a value of pic_type is 4, pic_type may indicate that a corresponding sample is an unconstrained I sample. In this case, the number of bits assigned to the pic_type field and/or the dependency_ level for the HEVE stream may be reduced. A sample may indicate the same meaning as a picture.

FIG. 15 is a view showing the configuration of an HEVC stream supporting temporal scalability according to an embodiment of the present invention.

In this figure, each quadrilateral box may indicate a picture included in a stream and T_ID may indicate temporal id.

FIG. 16 is a view showing the configuration of a trick play box for restricting the maximum X speed to support a trick play in an HEVC stream supporting temporal scalability according to an embodiment of the present invention (scenario 2).

This figure shows a method of signaling such that a maximally supportable X speed is restricted to support a trick play in a HEVC stream having a max_temporal_id of more than 0, i.e. supporting temporal scalability. For example, in a case in which a maximum temporal_id is 2, a maximum of X4 speed may be provided.

According to an embodiment of the present invention, a new box "trikhvc" may be defined. A trikhvc box according to an embodiment of the present invention may include a pic_type field, a temporal_sub layer_pic_type field, a max_temporal_id field, a temporal_id field, a constraint trick_play_mode field, and/or a next_temporal_id field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 4 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15p, in a case in which temporal_id is 1, a frame rate is 30p, and, in a case in which temporal_id is 2 (max_temporal_id), a frame rate is 60p, TSA may directly access a layer having a temporal_id of 2 from a layer having a temporal_id of 0 and, therefore, a broadcasting system may directly change a service such that a service having a frame rate of 60p is provided while a service having a frame rate of 15p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15p, a service having a frame rate of 30p, and a service having a frame rate of 60p.

The max_temporal_id field may indicate a maximum value of temporal_id included in a stream.

The temporal_id field may indicate a value of temporal_id calculated using a value of nuh_temporal_id_plus1 of HEVC. A value of the temporal_id field may indicate a value obtained by subtracting 1 from a value of nuh_temporal_id_plus1.

The constraint_trick_play_mode field may indicate providable maximum X speed information. The present invention may signal a providable maximum X speed through an equation of max_trick_play_mode (providable maximum X speed)=$2^{(max\_temporal\_id)}$ using a value of max_temporal_id. For example, in a case in which a maximum temporal_id is 2, the present invention may maximally provide an X4 speed ($2^2$). According to an embodiment of the present invention, the present invention may provide a limitation that a value less than the value calculated through the above-described equation is assigned to max_trick_play_ mode. For example, in a case in which a value of max_trick_play_mode is 1, it may indicate an X2 speed. In a case in which a value of max_trick_play_mode is 2, it may indicate an X4 speed. In a case in which a value of max_trick_play_mode is 3, it may indicate an X8 speed. In a case in which a value of max_trick_play_mode is 4, it may indicate an X16 speed. Constraint_trick_play_mode may have the same meaning as max_trick_play_mode. According to an embodiment of the present invention, an X speed higher than max_trick_play_mode may not be supported but an X speed equal to max_trick_play_mode may be supported. In addition, according to an embodiment of the present invention, a constraint that a value less than a value of max_trick_play_mode is assigned may be signaled.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

FIG. 17 is a view showing the configuration of a trick play box for restricting the maximum X speed to support a trick play in an HEVC stream supporting temporal scalability according to another embodiment of the present invention (scenario 2)

This figure shows a method of signaling such that a maximally supportable X speed is restricted to support a trick play in a HEVC stream having a max_temporal_id of more than 0, i.e. supporting temporal scalability. For example, in a case in which a maximum temporal_id is 2, a maximum of X4 speed may be provided.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field, dependency_level field, temporal_sub_layer_pic_type field, max_temporal_id field, temporal_id field, constraint_trick_play_mode field, and/or a next_temporal_id field in a for loop repeated by a value of flag and sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pie type field may indicate a value of 4 bits.

The dependency_level field may indicate a dependency level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15p, in a case in which temporal_id is 1, a frame rate is 30p, and, in a case in which temporal_id is 2 (max_temporal_id), a frame rate is 60p, TSA may directly access a layer having a temporal_id of 2 from a layer having a temporal_id of 0 and, therefore, a broadcasting system may directly change a service such that a service having a frame rate of 60p is provided while a service having a frame rate of 15p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15p, a service having a frame rate of 30p, and a service having a frame rate of 60p.

The max_temporal_id field may indicate a maximum value of temporal_id included in a stream.

The temporal_id field may indicate a value of temporal_id calculated using a value of nuh_temporal_id_plus1 of HEVC. A value of the temporal_id field may indicate a value obtained by subtracting 1 from a value of nuh_temporal_id_plus1.

The constraint_trick_play_mode field may indicate providable maximum X speed information. The present invention may signal a providable maximum X speed through an equation of max_trick_play_mode (providable maximum X speed)=2^(max_temporal_id) using a value of max_temporal_id. For example, in a case in which a maximum temporal_id is 2, the present invention may maximally provide an X4 speed (2^2). According to an embodiment of the present invention, the present invention may provide a limitation that a value less than the value calculated through the above-described equation is assigned to max_trick_play_mode. For example, in a case in which a value of max_trick_play_mode is 1, it may indicate an X2 speed. In a case in which a value of max_trick_play_mode is 2, it may indicate an X4 speed. In a case in which a value of max_trick_play_mode is 3, it may indicate an X8 speed. In a case in which a value of max_trick_play_mode is 4, it may indicate an X16 speed. Constraint_trick_play_mode may have the same meaning as max_trick_play_mode.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

Figure 18:
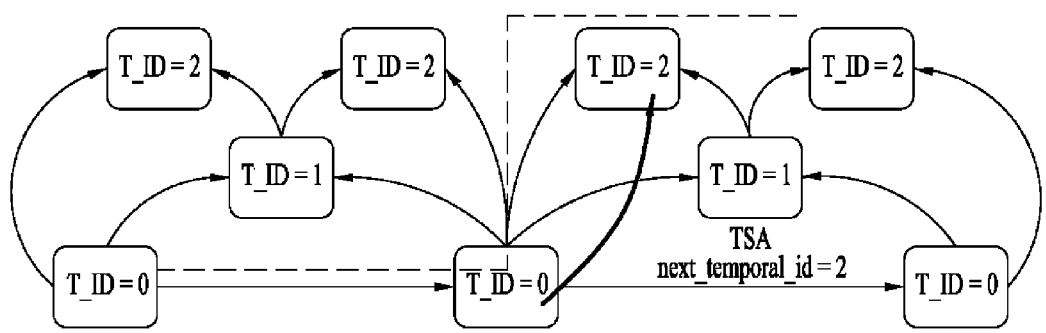
FIG. 18 is a view showing a frame rate changing method in a case in which a temporal sub-layer picture type is TSA according to an embodiment of the present invention.

FIG. 18 is a view showing a frame rate changing method in a case in which a temporal sub-layer picture type is TSA according to an embodiment of the present invention.

In a case in which a temporal sub-layer picture type is TSA as shown in this figure, a receiving side may directly display a stream at an X1 speed (normal X speed) during display of only a stream of a layer having a temporal_id of 0, i.e. during execution of a trick play at an X4 speed.

In a case in which a temporal sub-layer picture type is TSA as shown in this figure, the receiving side may directly decode and display a picture having a temporal_id of 2 during decoding and displaying of a picture having a temporal_id of 0.

Figure 19:
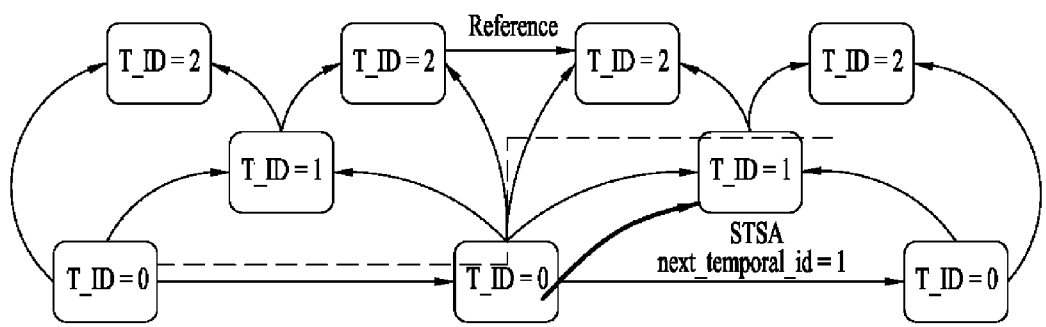
FIG. 19 is a view showing a frame rate changing method in a case in which a temporal sub-layer picture type is STSA according to an embodiment of the present invention (scenario 3).

FIG. 19 is a view showing a frame rate changing method in a case in which a temporal sub-layer picture type is STSA according to an embodiment of the present invention (scenario 3).

In a case in which a temporal sub-layer picture type is STSA as shown in this figure, a receiving side may not directly display a stream at an X1 speed (normal X speed) during display of only a stream of a layer having a temporal_id of 0, i.e. during execution of a trick play at an X4 speed. The receiving side may display a stream at an X2 speed and then display the stream at an X1 speed. In a case in which a temporal sub-layer picture type according to an embodiment of the present invention is STSA, therefore, a method of informing of a limitation for a convertible X speed may be needed. That is, it may be necessary to signal next_temporal_id.

In a case in which a temporal sub-layer picture type is STSA and it is necessary to display a stream at an X1 speed during displaying of the stream at an X4 speed as shown in this figure, the receiving side may not directly decode and display a picture having a temporal_id of 2 during decoding and displaying of a picture having a temporal_id of 0. The receiving side may decode and display a picture having a temporal_id of 1 and then decode and display a picture having a temporal_id of 2.

FIG. 20 is a view showing the configuration of a trick play box for supporting a high X speed trick play in an HEVC stream supporting temporal scalability according to an embodiment of the present invention (scenario 3).

According to an embodiment of the present invention, a new box "trikhvc" may be defined. A trikhvc box according to an embodiment of the present invention may include a pic_type field, a temporal_sub_layer_pic_type field, a max_temporal_id field, a temporal_id field, a next_temporal_id field, and/or a dependency_level field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pie type field may indicate a value of 4 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15p, in a case in which temporal_id is 1, a frame rate is 30p, and, in a case in which temporal_id is 2 (max_temporal_id), a frame rate is 60p, TSA may directly access a layer having a temporal_id of 2 from a layer having a temporal_id of 0 and, therefore, a broadcasting system may directly change a service such that a service having a frame rate of 60p is provided while a service having a frame rate of 15p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15p, a service having a frame rate of 30p, and a service having a frame rate of 60p.

The max_temporal_id field may indicate a maximum value of temporal_id included in a stream.

The temporal_id field may indicate a value of temporal id calculated using a value of nuh_temporal_id_plus1 of HEVC. A value of the temporal_id field may indicate a value obtained by subtracting 1 from a value of nuh_temporal_id_plus1.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

According to an embodiment of the present invention, the trick play box shown in this figure may include a max_trick_play_mode field indicating the maximum X speed supportable in a trick play.

According to an embodiment of the present invention, in a case in which max_temporal_id is 2, the receiving side may decode only pictures having temporal_ids of 0 and 1 to provide an X2 speed trick play service. In addition, the receiving side may decode and display only pictures having a temporal_id of 0 to provide an X4 speed trick play service. Furthermore, the receiving side may classify pictures having a temporal_id of 0 according to dependency_level and decode and display only pictures having corresponding dependency_level to provide a higher than X4 speed trick play service.

FIG. 21 is a view showing the configuration of a trick play box for supporting a high X speed trick play in an HEVC stream supporting temporal scalability according to another embodiment of the present invention.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field, a dependency_level field, a temporal_sub_layer_pic_type field, a max_temporal_id field, a temporal_id field, and/or a next_temporal_id field in a for loop repeated by a value of flag and sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC.

For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer pie type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15p, in a case in which temporal_id is 1, a frame rate is 30p, and, in a case in which temporal_id is 2 (max_temporal_id), a frame rate is 60p, TSA may directly access a layer having a temporal_id of 2 from a layer having a temporal_id of 0 and, therefore, a broadcasting system may directly change a service such that a service having a frame rate of 60p is provided while a service having a frame rate of 15p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15p, a service having a frame rate of 30p, and a service having a frame rate of 60p.

The max_temporal_id field may indicate a maximum value of temporal_id included in a stream.

The temporal_id field may indicate a value of temporal_id calculated using a value of nuh_temporal_id_plus1 of HEVC. A value of the temporal_id field may indicate a value obtained by subtracting 1 from a value of nuh_temporal_id_plus1.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

According to an embodiment of the present invention, the trick play box shown in this figure may include a max_trick_play_mode field indicating the maximum X speed supportable in a trick play.

According to an embodiment of the present invention, in a case in which max_temporal_id is 2, the receiving side may decode only pictures having temporal_ids of 0 and 1 to provide an X2 speed trick play service. In addition, the receiving side may decode and display only pictures having a temporal_id of 0 to provide an X4 speed trick play service. Furthermore, the receiving side may classify pictures having a temporal_id of 0 according to dependency_level and decode and display only pictures having a corresponding dependency_level to provide a higher than X4 speed trick play service.

Figure 22:
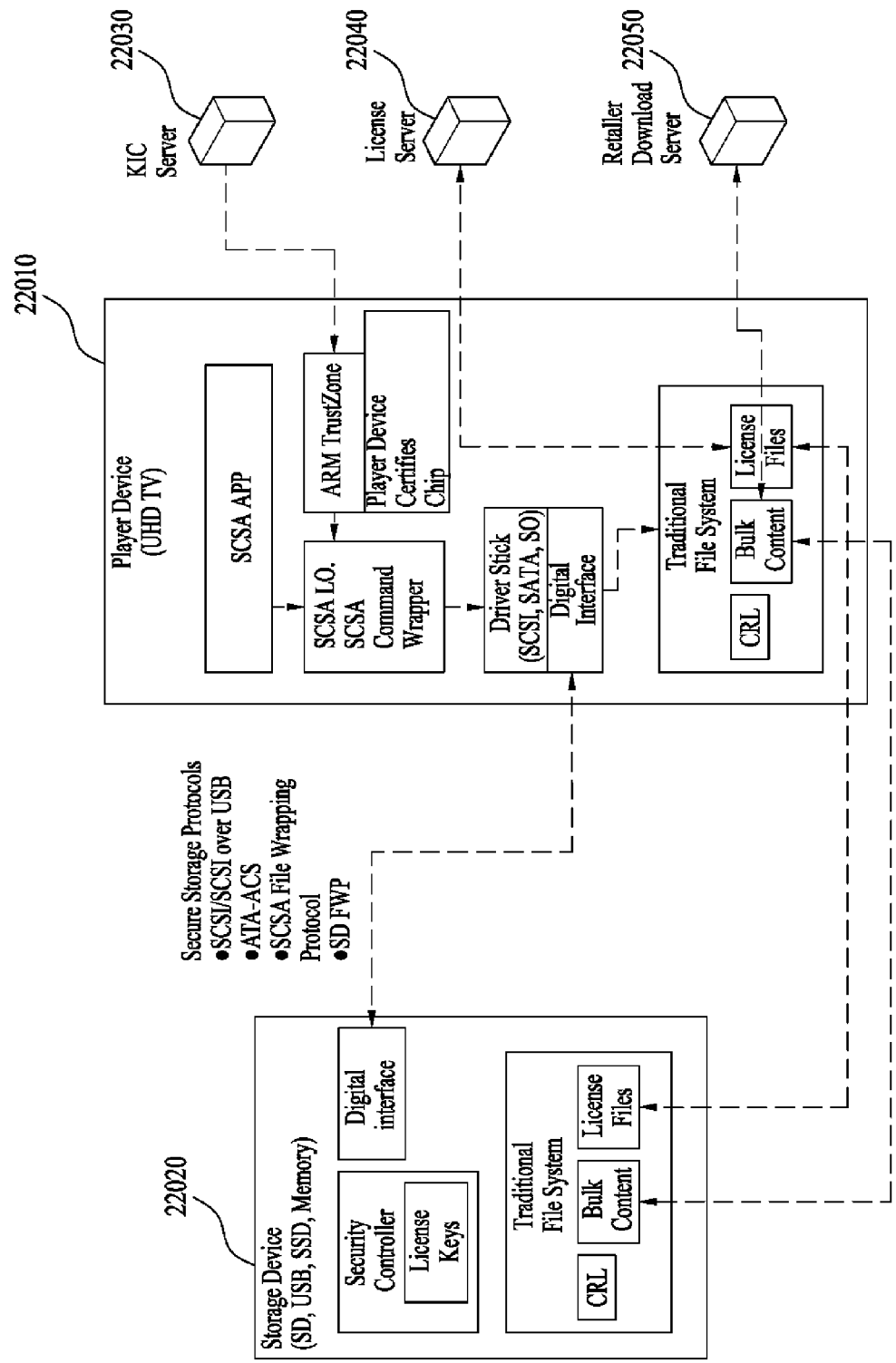
FIG. 22 is a view showing the structure of a broadcast signal receiving system according to an embodiment of the present invention.

FIG. 22 is a view showing the structure of a broadcast signal receiving system according to an embodiment of the present invention.

A broadcast signal receiving system according to an embodiment of the present invention may include a player device 22010, a storage device 22020, a KIC server 22030, a license server 22040, and/or a download server 22050.

The player device 22010 may include a UHD TV. The player device may include an SCSA application and a traditional file system The storage device 22020 may include an SD card, a USB memory, and/or an SSD memory. The storage device may include a traditional file system.

The KIC server 22030 may include information for identifying personal information.

The license server 22040 may include information related to a license of content.

The download server 22050 may include content and information related to the content.

According to an embodiment of the present invention, the player device may perform the following procedures to acquire a license of content. First, the player device may confirm whether the storage device includes a license file and, in a case in which the storage device includes the license file, may acquire a content key from the license file. In a case in which the storage device does not include the license file, the player device may confirm bulk content and, in a case in which the bulk content includes a license file, may acquire a content key from the license file. The player device may acquire a license from the license server using the content key.

According to an embodiment of the present invention, in order to display downloaded content, it may be necessary for a receiver to acquire a license of the corresponding content.

Figure 23:
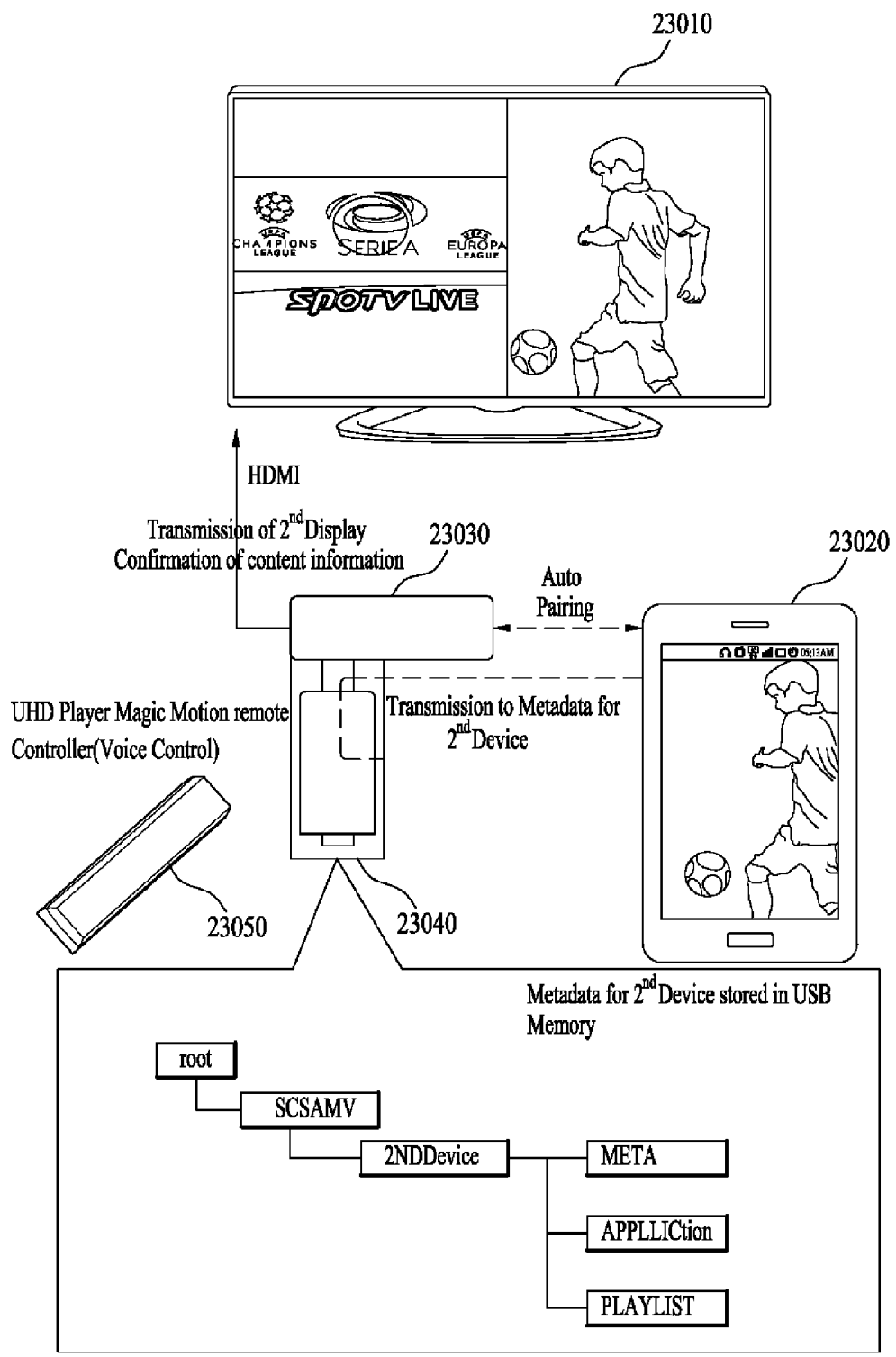
FIG. 23 is a view showing the structure of a receiving end according to an embodiment of the present invention.

FIG. 23 is a view showing the structure of a receiving end according to an embodiment of the present invention.

A receiving end according to an embodiment of the present invention may include a UHD display unit 23010, a second device 23020, a UHD decoding unit 23030, a USB memory 23040, and/or a remote controller 23050.

The UHD display unit 23010 may include the UHD decoding unit 23030 and may indicate a UHD TV.

The second device 23020 may indicate a mobile phone, a tablet PC, or a laptop computer.

The UHD decoding unit 23030 may include the UHD display unit 23010 and may indicate a UHD TV.

The USB memory 23040 ma indicate another memory device. A USB memory according to an embodiment of the present invention may store metadata, a URL, and/or a presentation list for a second screen.

The remote controller 23050 may indicate a controller suitable for a UHD TV.

According to an embodiment of the present invention, the UHD TV may transmit content metadata included in the USB memory to the second device and display the content metadata on a display unit of the second device. First, a user may store metadata, a URL, and/or a presentation list which will be displayed on the second screen in the USB memory. The UHD TV and the second device may automatically pair with each other. At this time, both the devices may be connected to each other through UPnP-based SSDP. When the USB memory is connected to the UHD TV, the UHD TV may transmit content information which will be displayed on the second screen, i.e. information included in the USB memory, to the second device. The second device may display information received from the UHD TV.

According to an embodiment of the present invention, the user may store information regarding a trick play in the USB memory and the information regarding the trick play may be displayed through the second device connected to the UHD TV.

Figure 24:
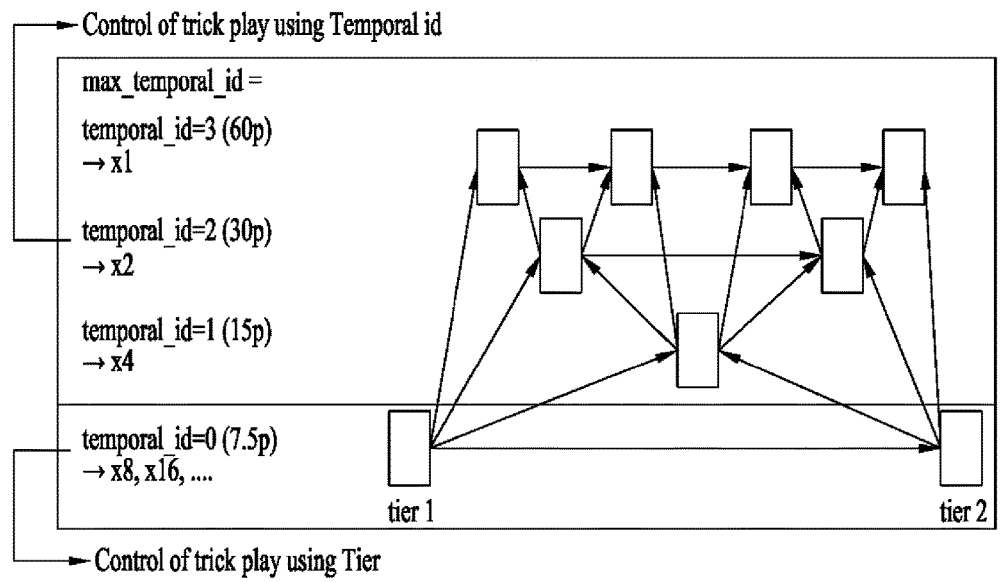
FIG. 24 is a view showing a trick play method compositively using a temporal id and a tier according to an embodiment of the present invention.

FIG. 24 is a view showing a trick play method compositively using a temporal id and a tier according to an embodiment of the present invention.

According to an embodiment of the present invention, a tier value may be assigned to only a picture having a temporal id of 0.

As shown in this figure, a receiver according to an embodiment of the present invention may decode and display pictures having a temporal id of 0, 1, 2, or 3 to execute a normal X speed trick play, may decode and display pictures having a temporal id of 0, 1, or 2 to execute an X2 speed trick play, may decode and display pictures having a temporal id of 0 or 1 to execute an X4 speed trick play, and may decode and display pictures having a temporal id of 0 to execute an X8 speed trick play. The present invention may assign different tier values to pictures having a temporal id of 0 to execute a higher than X8 speed trick play.

According to an embodiment of the present invention, the following methods may be used to provide a trick play. A trick play may be provided by mapping a tier and a temporal id to use a PVR_assist_info descriptor (scenario A). A trick play may be provided by including a trick play using a temporal id in a PVR_assist_info descriptor (scenario B). A trick play may be provided by parsing nuh_temporal_id_plus1 information of NAL_unit_header and selecting only packets necessary for a real trick play (scenario C).

A temporal sub-layer or a temporal id according to an embodiment of the present invention is a term introduced to support temporal scalability in HEVC and may be signaled by nuh_temporal_id_plus1 of NAL_unit_header.

A tier according to an embodiment of the present invention is a term introduced to support a trick play in an AVC stream or an mpeg-2 stream and may be included in an adaptation field in a TS packet.

Figure 25:
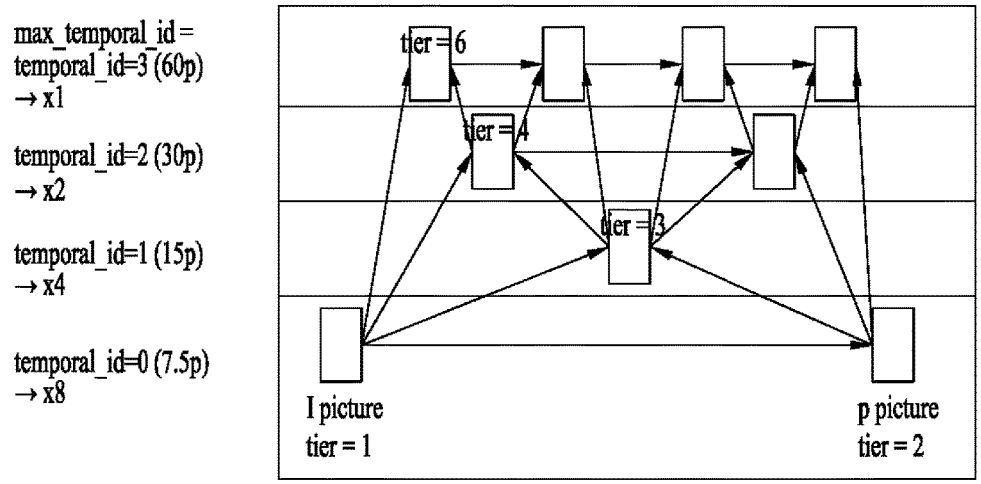
FIG. 25 is a view showing a trick play method based on a conventional tier concept according to an embodiment of the present invention.

FIG. 25 is a view showing a trick play method based on a conventional tier concept according to an embodiment of the present invention.

A conventional tier according to an embodiment of the present invention may indicate dependency between layers.

As shown in this figure, pictures having a temporal_id of 3 may have a tier value of 6, pictures having a temporal id of 2 may have a tier value of 4, and pictures having a temporal id of 1 may have a tier value of 3. In addition, I pictures having a temporal id of 0 may have a tier value of 1 and I pictures having a temporal id of 0 may have a tier value of 2. That is, pictures having a temporal id of 0 may have the same temporal and different tier values.

According to an embodiment of the present invention, pictures having max_temporal_id, i.e. highest dependency_level, may have a tier value of 6 or 7. Pictures having other temporal_ids may have a tier value of 1 to 5. At this time, pictures corresponding to a layer having a temporal_id of 0 may have a tier value of 1 or 2 according to a picture type.

Figure 26:
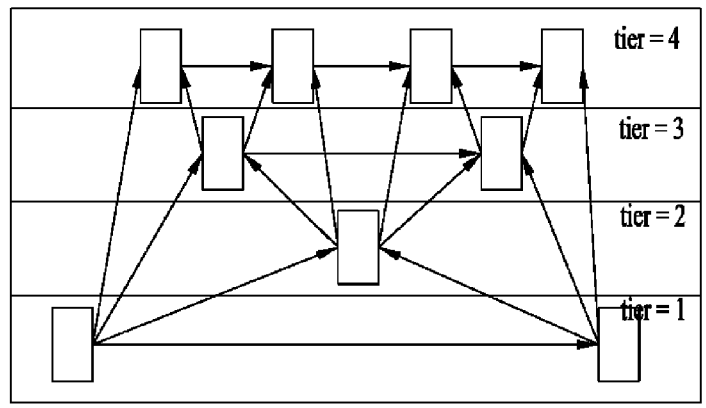
FIG. 26 is a view showing a trick play method based on a method of mapping one temporal id to one tier one to one according to an embodiment of the present invention (scenario A-a).

FIG. 26 is a view showing a trick play method based on a method of mapping one temporal id to one tier one to one according to an embodiment of the present invention (scenario A-a).

According to an embodiment of the present invention, a method of mapping a temporal id and a tier may be used to provide a trick play based on an HEVC stream which includes a temporal id but does not include tier information (scenario A).

In order to provide a trick play according to an embodiment of the present invention, a method of mapping one temporal id to one tier one to one may be used (scenario A-a) and a method of mapping one temporal id to several tiers may be used (scenario A-b).

According to an embodiment of the present invention, in scenario A-a and scenario A-b as described above, a value of temporal id may be mapped to a tier one to one as it is irrespective of the meaning of a conventional tier.

According to another embodiment of the present invention, in scenario A-a and scenario A-b as described above, a value of temporal id may be mapped to a tier one to one and a maximum temporal id may be mapped to tier 6 or 7, which has meaning of a conventional tier as a discardable picture as it is.

According to scenario A as described above, most of a conventional PVR_assist_info descriptor may be used as it is. However, an embodiment of the present invention is based on a HEVC stream and, therefore, it is necessary to modify some fields included in the PVR_assist_info descriptor. For example, it may be newly defined that a PVR_assist_tier_m_cumulative_frames field included in the PVR_assist_info descriptor may deliver a value of the minimum number of frames extractable per 1.28 seconds from tier 1 through a PVR_assist_tier_m field (This field conveys the value of the intended minimum number of extractable frames per 1.28 sec. from tier 1 through "PVR_assist_teir_m").

This figure shows a trick play method based on scenario A-a according to an embodiment of the present invention.

As shown in this figure, pictures having a temporal_id of 3 may be mapped to tier 4, pictures having a temporal id of 2 may be mapped to tier 3, pictures having a temporal id of 1 may be mapped to tier 2, and pictures having a temporal id of 0 may be mapped to tier 1.

Scenario A according to an embodiment of the present invention may not provide an 8× and higher speed trick play.

Figure 27:
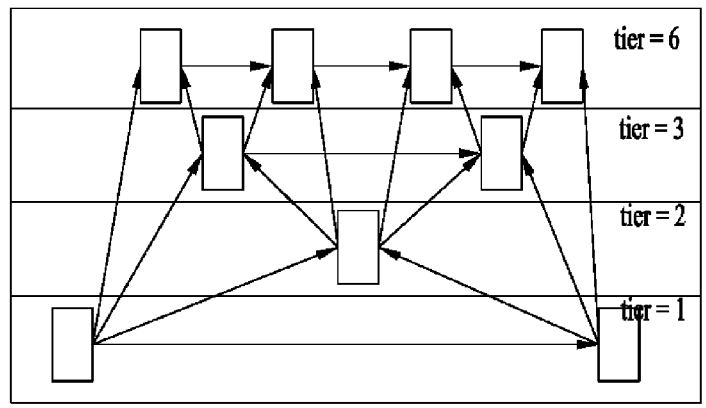
FIG. 27 is a view showing a trick play method based on a method of mapping one temporal id to one tier one to one according to another embodiment of the present invention (scenario A-a).

FIG. 27 is a view showing a trick play method based on a method of mapping one temporal_id to one tier one to one according to another embodiment of the present invention (scenario A-a).

According to an embodiment of the present invention, a value of temporal id may be mapped to a tier one to one and a maximum temporal_id may be mapped to tier 6 or 7, which has meaning of a conventional tier as a discardable picture as it is unlike the previous figure.

As shown in this figure, pictures having a temporal id of 3 may be mapped to tier 6, pictures having a temporal id of 2 may be mapped to tier 3, pictures having a temporal id of 1 may be mapped to tier 2, and pictures having a temporal id of 0 may be mapped to tier 1.

This figure is different from the previous figure in that pictures corresponding to temporal id 3, which is a maximum temporal id, are mapped to tier 6.

Figures 28, 29, 30:
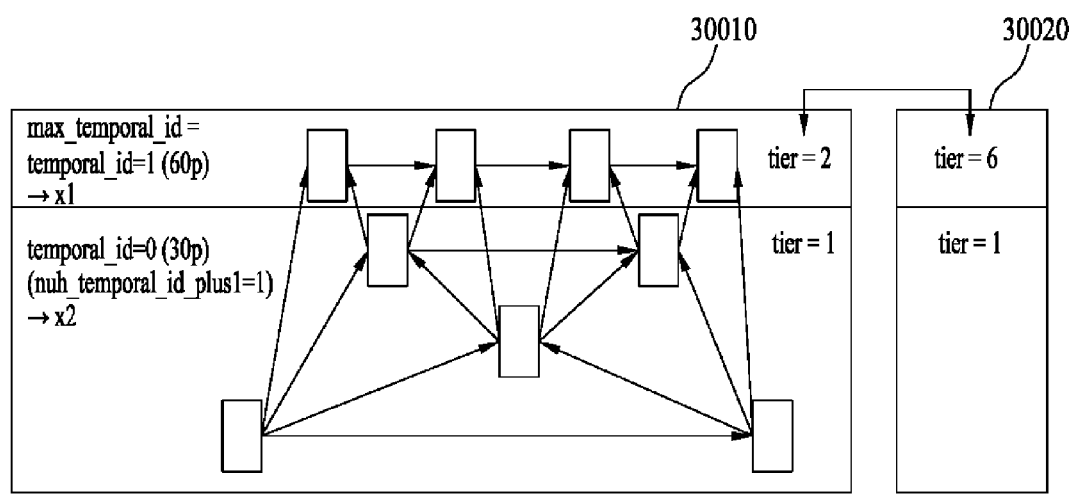
FIG. 28 is a view showing a result of mapping one temporal id to one tier one to one according to an embodiment of the present invention.
FIG. 29 is a view showing a result of mapping one temporal id to one tier one to one according to another embodiment of the present invention.
FIG. 30 is a view showing a trick play method based on a method of mapping one temporal id to several tiers according to an embodiment of the present invention (scenario A-b).

FIG. 28 is a view showing a result of mapping one temporal id to one tier one to one according to an embodiment of the present invention.

This figure shows a result of mapping a value of temporal id to a tier one to one as it is irrespective of the meaning of a conventional tier in scenario A-a according to an embodiment of the present invention.

A nuh_temporal_id_plus1 field shown in this figure may be a field included in NAL_unit_header and may indicate a value obtained by adding 1 to a temporal id. For example, in a case in which a value of the nuh_temporal_id_plus1 field is 1, a temporal id may be 0. As shown in this figure, therefore, pictures having a temporal id of 0 may be mapped to tier 1, pictures having a temporal id of 1 may be mapped to tier 2, pictures having a temporal id of 2 may be mapped to tier 3, and pictures having a temporal id of 3 may be mapped to tier 4.

According to an embodiment of the present invention, a new tier mapped with a temporal id may be different in meaning from a conventionally used tier. Conventional tiers 6 and 7 may mean discardable pictures and tier 7 may mean a picture which is not used as reference. However, a tier newly defined through mapping may not have meaning of conventional tiers 6 and 7.

An embodiment of the present invention may map a temporal sub-layer and a tier so as to have the same number and may use the above-described mapping information when executing a trick play.

FIG. 29 is a view showing a result of mapping one temporal id to one tier one to one according to another embodiment of the present invention.

This figure shows a result of mapping a value of temporal id to a tier one to one and mapping a maximum temporal id to tier 6 or 7, which has meaning of a conventional tier as a discardable picture as it is in scenario A-a according to another embodiment of the present invention.

A nuh_temporal_id plus1 field shown in this figure may be a field included in NAL_unit_header and may indicate a value obtained by adding 1 to a temporal id. For example, in a case in which a value of the nuh_temporal_id_plus1 field is 1, a temporal id may be 0. As shown in this figure, therefore, pictures having a temporal_id of 0 may be mapped to tier 1, pictures having a temporal id of 1 may be mapped to tier 2, pictures having a temporal id of 2 may be mapped to tier 3, and pictures having a temporal id of 3 may be mapped to tier 6.

According to an embodiment of the present invention, a new tier mapped with a temporal id may be identical in meaning to a conventionally used tier. Tiers 6 and 7 may mean discardable pictures, tier 6 may mean a picture which is used as reference, and tier 7 may mean a picture which is not used as reference. As described above, therefore, pictures having a nuh_temporal_id plus1 of 4 may be mapped to tier 6. Pictures which are not used as reference may be mapped to tier 7.

FIG. 30 is a view showing a trick play method based on a method of mapping one temporal id to several tiers according to an embodiment of the present invention (scenario A-b).

As shown in this figure, pictures having a temporal id of 1, which is a maximum temporal id, may be mapped to tier 4 or 6 and the other five pictures having a temporal id of 0 may be mapped to tiers 0 to 3.

According to an embodiment of the present invention, a new tier mapped with a temporal id may be different in meaning from a conventionally used tier. Conventional tiers 6 and 7 may mean discardable pictures and tier 7 may mean a picture which is not used as reference. However, a tier newly defined through mapping may not have meaning of conventional tiers 6 and 7. As shown in this figure, therefore, pictures having a temporal id of 1 may be mapped to tier 4 (30010).

According to another embodiment of the present invention, a new tier mapped with a temporal id may be identical in meaning to a conventionally used tier. Tiers 6 and 7 may mean discardable pictures, tier 6 may mean a picture which is used as reference, and tier 7 may mean a picture which is not used as reference. As shown in this figure, therefore, pictures having a temporal id of 1 may be mapped to tier 6 (30020).

FIG. 31 is a view showing the configuration of an adaptation field of a TS packet including information for mapping of a temporal id and a tier according to an embodiment of the present invention.

An embodiment of the present invention may provide a descriptor for values of tier and nuh_temporal_id_plus1 with speed information for a trick play.

According to an embodiment of the present invention, information for a conventional trick play is included in an adaptation field of a TS packet and, therefore, HEVC_temporal_id_tier_mapping_info, which is information for a trick play of a HEVC stream including a temporal_id, may also be included in the above-described adaptation field.

This figure shows the configuration of a data field included in the adaptation field of the TS packet.

As shown in this figure, in a case in which data_field_tag is 0x00, a corresponding data field may indicate a reserved field. In a case in which data_field_tag is 0x01, a corresponding data field may indicate an announcement switching data field. In a case in which data_field_tag is 0x02, a corresponding data field may indicate a data field for AU_information. In a case in which data_field_tag is 0x03, a corresponding data field may indicate a data field for PVR_assist_information. In a case in which data_field_tag is 0x04, a corresponding data field may indicate a data field indicating a TSAP time line. In a case in which data_field_tag is 0x05, a corresponding data field may indicate a data field for HEVC_temporal_id_tier_mapping_info.

An embodiment of the present invention may map a tier value to a temporal_id using an HEVC_temporal_id_tier_mapping_info descriptor and provide a tier-based trick play using a PVR_assist_information descriptor.

FIG. 32 is a view showing the configuration of HEVC_temporal_ id_ mapping_info according to an embodiment of the present invention.

HEVC_temporal_id_tier_mapping_info according to an embodiment of the present invention may include an included_temporal_id_flag field, a temporal_sub_layer_dependency_flag field, a max_temporal_id_plus1 field, a temporal_id_ plus1 field, a curr_tier_num field, and/or a trick_play_speed field.

The included_temporal_id_flag field may signal whether encoding has been performed using a temporal_id.

The temporal_sub_layer_dependency_flag field may indicate dependency between temporal sub-layers. That is, the temporal_sub_layer_dependency_flag field has a value of 1 in a case in which a lower temporal sub-layer picture does not refer to an upper temporal sub-layer picture.

The max_temporal_id_plus1 field may indicate a maximum value of a temporal id. A value indicated by the max_temporal_id_plus1 field is a value obtained by adding 1 to a temporal_id.

The temporal_id_plus1 field may have a value equal to a value indicated by nuh_temporal_id_plus1 included in an NAL unit header.

The curr_tier_num field may indicate a tier value mapped with temporal_id_plus1.

The trick_play_speed field may indicate a trick play speed that can be maximally provided according to a value of a temporal id.

An if(max_temporal_id_plus1>1) condition statement may indicate a case in which max_temporal_id_plus1 is greater than 1, i.e. a stream using temporal scalability. In this case, a trick play may be provided using a temporal_id and, therefore, an embodiment of the present invention may map a temporal_id to a tier so as to use conventional PVR_assist_information.

Another embodiment of the present invention may locate the temporal_id_plus1 field in a for loop at the same level as the curr_tier_num field and the trick_play_speed and signal a tier number based on each temporal id and a speed for a trick play. An embodiment of the present invention may create a look up table using a descriptor including the above-described HEVC_temporal_id_tier_mapping_info and may interpret and use tier-related information of PVR_assist_information as temporal_id using the above-described look up table.

Another embodiment of the present invention may delete a for loop from the above-described HEVC_temporal_id_tier_mapping_info and locate the curr_tier_num field and the trick_play_speed at a level at which the temporal_id_plus1 field is located. An embodiment of the present invention may signal a descriptor including the above-described HEVC_temporal_id_tier_mapping_info per picture.

FIG. 33 is a view showing the configuration of a trick play_speed field included in HEVC_temporal_id_tier_mapping_info according to an embodiment of the present invention.

In a case in which a trick_play_speed field according to an embodiment of the present invention is 0, a providable X speed of a trick play may be an X1 speed. In a case in which a trick_play_speed field is 1, a providable X speed of a trick play may be an X2 speed. In a case in which a trick_play_speed field is 2, a providable X speed of a trick play may be an X4 speed. In a case in which a trick play_speed field is 3, a providable X speed of a trick play may be an X8 speed. In a case in which a trick_play_speed field is 4, a providable X speed of a trick play may be an X16 speed. In a case in which a trick_play_speed field is 5, a providable X speed of a trick play may be an X32 speed. In a case in which a trick_play_speed field is 6, a providable X speed of a trick play may be an X64 speed.

FIG. 34 is a view showing the configuration of PVR_assist_information according to an embodiment of the present invention.

PVR_assist_information according to an embodiment of the present invention may include a data_field_tag field, a data_field_length field, a PVR_assist_tier_pic_num field, a PVR_assist_block_trick_mode_present_flag field, a PVR_assist_pic_struct_present_flag field, a PVR_assist_tier_next_pic_in_tier_present_flag field, a PVR_assist_substream_info_present_flag field, a PVR_assist_extension_present_flag field, a PVR_assist_segmentation_info_present_flag field, a PVR_assist_tier_m_cumulative_frames_present_flag field, a PVR_assist_tier_n_mmco_present_flag field, a PVR_assist_reserved_0 field, a PVR_assist_seg_id field, a PVR_assist_prg_id field, a PVR_assist_seg_start_flag field, a PVR_assist_seg_end_ flag field, a PVR_assist_prg_start_ flag field, a PVR_assist_prg_stop_ flag field, a PVR_assist_ scene_change_flag field, a PVR_assist_tier_m field, a PVR_assist_tier_m_cumulative_frames field, and/or a PVR_assist_tier_n_mmco field.

The data_field_tag field may indicate that a corresponding data field is PVR_assist_information. The data_field_tag field may have a value of 0x03.

The data_field_length field may indicate a length of PVR_assist—_information excluding the data_field_tag field and the data_field_length field.

The PVR_assist_tier_pic_num field may indicate a tier number of a picture related to PVR_assist_information. A minimum tier number may be 0 and a maximum tier number may be 7. Tier number 0 may be reserved for future use. According to an embodiment of the present invention, for HEVC, a tier number of a HEVC RAP picture may be 0 and a tier number of all other pictures different from the HEVC RAP may be a value obtained by adding 1 to a temporal id. According to an embodiment of the present invention, this field may indicate a tier number of a picture included in a video stream and may be named tier number information. The tier number may be used to signal a temporal sub-layer. PVR_assist_tier_pic_num may be named tier number information.

The PVR_assist_block_trick_mode_present_flag field may have a value of 1 at a picture which is not a RAP picture in a case in which this field has a value of 1 at the previous RAP picture.

The PVR_assist_pic_struct_present_flag field may have a value of 1 in a case in which a video stream is an AVC or HEVC stream and a PVR_assist_pict_struct field exists.

The PVR_assist_tier_next_pic_in_tier_present_flag field may have a value of 1 in a case in which a PVR_assist_tier_next_pic_in_tier field exists.

The PVR_assist_substream_info_present_flag may have a value of 1 in a case in which a PVR_assist_substream_info field exists.

The PVR_assist_extension_present_flag field may have a value of 1 in a case in which any one selected from among the PVR_assist_segmentation_info_present_flag field, the PVR_assist_tier_m_cumulative_frames_present_flag field, the PVR_assist_tier_n_mmco_present_flag field, and a PVR_assist_temporal_id_info_present_flag field has a value of 1.

The PVR_assist_segmentation_info_present_flag field may have a value of 1 in a case in which a PVR_assist_segmentation_info field exists. This field may be named segmentation info flag information and may indicate existence or nonexistence of information regarding a segment to which a picture belongs.

The PVR_assist_tier_m_cumulative_frames_present_flag field may have a value of 1 in a case in which the PVR_assist_tier_m field and the PVR_assist_tier_m_cumulative_frames field exist. For HEVC, it may be recommended that this field has a value of 0.

The PVR_assist_tier_n_mmco_present_flag field may have a value of 1 in a case in which the PVR_assist_tier_n_mmco field exists. For HEVC, this field may have a value of 0.

The PVR_assist_seg_id field may deliver an id of a segment to which a picture belongs. This field may be named segment identifier information and may indicate an id of a segment to which a picture belongs.

The PVR_assist_prg_id field may deliver an id of a program to which a picture belongs. This field may be named program identifier information and may indicate an id of a program to which a picture belongs.

The PVR_assist_seg_start_flag field may have a value of 1 in a case of a picture having a first presentation order in one segment. This field may be named segment start flag information and may identify a picture having a first presentation order in each segment.

The PVR_assist_seg_end_flag field may have a value of 1 in a case of a picture having a last presentation order in one segment. This field may be named segment end flag information and may identify a picture having a last presentation order in each segment.

The PVR_assist_prg_start_flag field may have a value of 1 in a case of a picture having a first presentation order in one program. This field may be named program start flag information and may identify a picture having a first presentation order in each program.

The PVR_assist_prg_stop_flag field may have a value of 1 in a case of a picture having a last presentation order in one program. This field may be named program end flag information and may identify a picture having a last presentation order in each program.

The PVR_assist_scene_change_flag field may have a value of 1 in a case of a first picture of a new scene in presentation order.

The PVR_assist_tier_m field may indicate a tier number related to the PVR_assist_tier_m_cumulative_frames field. For HEVC, this field may not exist.

The PVR_assist_tier_m_cumulative_frames field may deliver a value of the minimum number of frames extractable per second from tier 1 through the PVR_assist_tier_m field.

The PVR_assist_tier_n_mmco field may indicate a minimum tier number below MMCOs which may be ignored by a decoder during execution of a trick play. For HEVC, this field may not exist.

PVR_assist_information according to an embodiment of the present invention may further include a PVR_assist_tier_next_pic_tier field. The PVR_assist_tier_next_pic_tier may indicate a relative position of the next picture in decoding order among pictures having a tier number equal to a value indicated by the PVR_assist_tier_pic_num field and may be named tier next picture information.

PVR_assist_information according to an embodiment of the present invention may include metadata for executing a trick play of video data and may be named PVR assist information.

FIG. 35 is a view showing the configuration of PVR_assist_information having a temporal id frame work added thereto according to an embodiment of the present invention (scenario B-a-a).

An embodiment of the present invention may provide a method of including a trick play using a temporal id in conventional PVR_assist_information included in an adaptation field of a TS packet. That is, an embodiment of the present invention may provide a temporal id frame work.

An embodiment of the present invention may signal PVR_assist_temporal_id_plus1 together with conventional PVR_assist_tier_pic_num to support temporal scalability based on a temporal id.

According to an embodiment of the present invention, PVR_assist_information may include all fields described above with reference to the previous figure showing the configuration of PVR_assist_information, a PVR_assist_temporal_id_plus1 field, PVR_assist_temporal_id_info_present_flag field, and/or a PVR_assist_max_temporal_id_plus1 field.

In this figure, fields having the same names as the fields described above with reference to the previous figure showing the configuration of PVR_assist_information may have the same meanings as the fields described above with reference to the previous figure.

The PVR_assist_temporal_id_plus1 field may indicate a value of a temporal id of a current frame and may actually indicate a value equal to a value of nuh_temporal_id_plus1 included in an NAL unit header.

The PVR_assist_temporal_id_info_present_flag field may include whether information related to a temporal id is included. In a case in which the PVR_assist_max_temporal_id_plus1 field exists, this field may indicate a value of 1. This field may be provided for every RAP picture.

The PVR_assist_max_temporal_id_plus1 field may indicate a maximum value of a temporal id and may actually indicate a value obtained by adding 1 to the maximum value of the temporal id. This field may have a value of any one selected from among 0 to 6. This field may be used to provide information regarding speed of a trick play.

According to an embodiment of the present invention, an X speed of a trick play may be calculated using a value of the PVR_assist_max_temporal_id_plus1 field and a value of the PVR_assist_temporal_id_plus1 field.

FIG. 36 is a view showing the configuration of PVR_assist_information having a temporal id frame work added thereto according to another embodiment of the present invention (scenario B-a-b).

An embodiment of the present invention may provide a method of including a trick play using a temporal id in conventional PVR_assist_information included in an adaptation field of a TS packet. That is, an embodiment of the present invention may provide a temporal id frame work.

An embodiment of the present invention may use a PVR_assist_tier_pic_num field as it is and may contain meaning of PVR_assist_temporal_id_plus1 in the PVR_assist_tier_pic_num field. In addition, an embodiment of the present invention may inform that meaning of a tier has been changed using a PVR_assist_tier_pic_num_to_temporal_id_ flag field.

According to an embodiment of the present invention, PVR_assist_information may include all fields described above with reference to the previous figure showing the configuration of PVR_assist_information, a PVR_assist_tier_pic_num_to_temporal_id_flag field, a PVR_assist_temporal_id_info_present_flag field, and/or a PVR_assist_max_temporal_id_plus1 field.

In this figure, fields having the same names as the fields described above with reference to the previous figure showing the configuration of PVR_assist_information may have the same meanings as the fields described above with reference to the previous figure. However, the PVR_assist_tier_pic_num field may be used for the temporal id frame work as it is according to an embodiment of the present invention. That is, the PVR_assist_tier_pic_num field may indicate a value of a temporal id of a current frame and may actually have a value equal to a value of nuh_temporal_id_plus1 included in an NAL unit header.

The PVR_assist_tier_pic_num_to_temporal_id_flag field may have a value of 1 in a case in which the PVR_assist_tier_pic_num is used as a field indicating a temporal id.

The PVR_assist_temporal_id_info_present_flag field may indicate whether information related to a temporal id is included.

The PVR_assist_max_temporal_id_plus1 field may indicate a maximum value of a temporal id and may actually indicate a value obtained by adding 1 to the maximum value of the temporal id.

According to an embodiment of the present invention, an X speed of a trick play may be calculated using a value of the PVR_assist_tier_pic_num having meaning of the PVR_assist_max_temporal_id_plus1 field and the PVR_assist_temporal_id_plus1 field.

Another embodiment of the present invention may include a PVR_assist_framework field having a value of 2 bits or more in PVR_assist_information to classify types of frameworks providing PVR. An embodiment of the present invention may classify a conventional tier, a substream framework, and a temporal id framework. In this case, flag values included in conventional PVR_assist_information may not be used and an embodiment of the present invention may configure a condition statement on behalf of a tag value corresponding to each framework.

FIG. 37 is a view showing the configuration of PVR_assist_information for supporting a trick play using a temporal id according to an embodiment of the present invention (scenario B-b).

PVR_assist_information according to an embodiment of the present invention may include a data_field_tag field, a data_field_length field, a PVR_assist_temporal_id_plus1 field, a PVR_assist_substream_info_present_flag field, a PVR_assist_extension_present_flag field, a PVR_assist_temporal_id_present_flag field, a PVR_assist_temporal_sub_layer_dependency_flag field, a PVR_assist_max_temporal_id_plus1 field, a PVR_assist_curr_tier_num field, and/or a PVR_assist_trick_play_speed field.

The data_field_tag field may indicate that a corresponding data field is PVR_assist_information. The data_field_tag field may have a value of 0x03.

The data_field_length field may indicate a length of PVR_assist_information excluding the data_field_tag field and the data_field_length field.

The PVR_assist_temporal_id_plus1 field may indicate a value of a temporal id of a current frame and may actually indicate a value equal to a value of nuh_temporal_id_plus1 included in an NAL unit header.

The PVR_assist_substream_info_present_flag field may have a value of 1 in a case in which a PVR_assist_substream_info field exists.

The PVR_assist_extension_present_flag field may have a value of 1 in a case in which any one selected from among a PVR_assist_segmentation_info_present_flag field, a PVR_ assist_tier_m_cumulative_frames_present_flag field, and a PVR_assist_tier_n_mmco_present_flag field has a value of 1.

The PVR_assist_temporal_id_info_present_flag field may indicate whether information related to a temporal id is included.

The PVR_assist_temporal_sub_layer_dependency_flag field may indicate dependency between temporal sub-layers. That is, the temporal_sub_layer_dependency_flag field has a value of 1 in a case in which a lower temporal sub-layer picture does not refer to an upper temporal sub-layer picture.

The PVR_assist_max_temporal_id_plus1 field may indicate a maximum value of a temporal id and may actually indicate a value obtained by adding 1 to the maximum value of the temporal id.

The PVR_assist_curr_tier_num field may indicate a tier value corresponding to temporal_id_plus1.

The trick_play_speed field may indicate a trick play speed that can be maximally provided according to a value of a temporal id.

An if(PVR_assist_max_temporal_id_plus1>1) condition statement may indicate a case in which PVR_assist_max_temporal_id_plus1 is greater than 1, i.e. a stream using temporal scalability. In this case, a trick play may be provided using a temporal_id.

Another embodiment of the present invention may locate the PVR_assist_temporal_id_plus1 field in a for loop at the same level as the PVR_assist_curr_tier_num field and the PVR_assist_trick_play_speed field and signal a tier number based on each temporal id and a speed for a trick play.

Another embodiment of the present invention may change and use a value of the PVR_assist_tier_pic_num field so as to indicate a value of the PVR_assist_temporal_id_plus1 field in a state in which the above-described field is left as it is. In this case, it is necessary to signal that meaning of the PVR_assist_tier_pic_num field has been changed using the PVR_assist_tier_pic_num_to_temporal_id_flag field.

A further embodiment of the present invention may provide a trick play using only a temporal id without a tier. That is, a trick play may be provided by parsing nuh_temporal_id_plus1 information of NAL_unit_header and selecting only packets necessary for a real trick play (scenario C). For example, in a case in which it is necessary to play a stream having a temporal id of 0 to 3 at an X2 speed, an embodiment of the present invention may provide an X2 speed trick play by delivering only a TS packet having a nuh_temporal_id_plus1 value of 1, 2, or 3 to a system decoder.

FIG. 38 is a view showing a receiving apparatus according to an embodiment of the present invention.

A receiving apparatus according to an embodiment of the present invention may include a tuner 38010, a demodulator 38020, a trick play execution unit 38030, a system decoder and demux 38040, and/or a video decoder 38050.

The tuner 38010 may receive a broadcast signal transmitted through a broadcasting network, a cable network, and/or an Internet network. The tuner may receive a transport stream (TS). The TS may include PVR assist information for executing a trick play. The PVR assist information may include tier number information and/or maximum temporal identification information. The above-described tier number information may indicate a tier number having a value obtained by adding 1 to a temporal identification information value of a picture different from a RAP picture and the above-described maximum temporal identification information may indicate a maximum temporal identification information value of a video stream including encoded video data.

The demodulator 38020 may demodulate a broadcast signal modulated according to a modulation method.

The trick play execution unit 38030 may select a TS packet for a trick play according to a method based on scenarios. Scenarios 1, 2, and 3 according to an embodiment of the present invention have been previously described in detail.

The system decoder and demux 38040 may decode system information and separate a multiplexed broadcast signal per unit stream. The demux may demultiplex a received broadcast signal to extract a video stream. A demux according to an embodiment of the present invention may include a first extraction unit and/or a second extraction unit according to an embodiment of the present invention. The first extraction unit may extract a packetized elementary stream (PES) from the received TS. The second extraction unit may extract a video elementary stream (ES) from the extracted PES.

The video decoder 38050 may decode a video stream. The video decoder may include the system decoder and the trick play execution unit. The video decoder may execute a trick play of a video stream by decoding a video stream selected for a trick play based on the PVR assist information. The video decoder may execute a trick play based on the temporal identification information and the maximum temporal identification information included in the PVR assist information.

A video stream according to an embodiment of the present invention may indicate a video elementary stream (ES).

FIG. 39 is a view showing comparison between a tier framework and an HEVC temporal sub-layer according to an embodiment of the present invention.

A hierarchical structure of an HEVC temporal sub-layer according to an embodiment of the present invention is similar to a tier system framework. A temporal id according to an embodiment of the present invention may be matched to a tier number. An HEVC temporal sub-layer according to an embodiment of the present invention may support PVR using a method similar to the tier system framework.

An HEVC compliant encoder/decoder according to an embodiment of the present invention may support an HEVC temporal sub-layer. An temporal id according to an embodiment of the present invention may exist in a stream encoded by HEVC. In a case in which a stream is encoded by a temporal sub-layer structure, any special encoding structure for a trick play may not be needed. Consequently, an HEVC temporal sub-layer according to an embodiment of the present invention may reduce an encoding burden in a case in which a trick play is supported.

As shown in this figure, in a tier framework, tier 7 means non-referenced discardable pictures and tier 6 means referenced discardable pictures. However, an HEVC temporal sub-layer according to an embodiment of the present invention may not classify referenced pictures and non-referenced pictures. In the tier framework, tier 1 indicates RAP pictures and tier 2 indicates P pictures. In an HEVC temporal sub-layer according to an embodiment of the present invention, however, temporal id 0 may indicate all of I pictures including IRAP pictures, P pictures, and B pictures.

According to an embodiment of the present invention, other sub-layers may be designated to temporal ids 6 and 7. As compared with tier numbers 6 and 7, therefore, an additional X speed may be supported in a case in which a temporal id is used according to an embodiment of the present invention.

According to an embodiment of the present invention, it may be necessary to classify frames in a base sub-layer having a temporal id of 0 so as to support a higher X speed.

FIG. 40 is a view showing the configuration of PVR_assist_information according to another embodiment of the present invention.

According to an embodiment of the present invention, a temporal id given to a video level may be signaled at a system level to filter access units (AUs) before a decoding procedure.

According to an embodiment of the present invention, an intra frame may be signaled in a base sub-layer having a temporal id of 0 so as to support a higher X speed PVR_assist_information according to an embodiment of the present invention may include a data_field_tag field, a data_field_length field, a PVR_assist_temporal_id_plus1 field, a PVR_assist_temporal_id_info_present_flag field, a PVR_assist_intra_picture_flag field, a PVR_assist_max_temporal_id_plus1 field, a PVR_assist_PB_numbers_in_temporal_id_zero field, a PVR_assist_reserved_0 field, and/or a PVR_assist_reserved_byte field.

The data_field_tag field may indicate that a corresponding data field is PVR_assist_information. The data_field_tag field may have a value of 0x03.

The data_field_length field may indicate a length of PVR_assist_information excluding the data_field_tag field and the data_field_length field.

The PVR_assist_temporal_id_plus1 field may indicate a temporal id of a picture. Actually, a temporal id may have a value obtained by subtracting 1 from a value of this field. This field may have a minimum value of 1 and a maximum value of 7. For a HEVC stream, this field may have a value equal to a value of nuh_temporal_id_plus1.

The PVR_assist_temporal_id_info_present_flag field may have a value of 1 in a case in which the PVR_assist_max_temporal_id_plus1 field exists. This field may be provided in only pictures corresponding to RAP pictures.

The PVR_assist_intra_picture_flag field may have a value of 1 in a case in which a current access unit is an intra picture.

The PVR_assist_max_temporal_id_plus1 field may indicate a maximum temporal id. Actually, the maximum temporal id may indicate a value obtained by subtracting 1 from a value of this field. This field may have a value of 1 to 7.

The PVR_assist_PB_numbers_in_temporalId_zero field may indicate the number of frames, existing between intra frames, different from the intra frames in a base sub-layer having a temporal id of 0. This field may be used to estimate speed of a trick play.

The PVR_assist_reserved_0 field is a field reserved for future use.

The PVR_assist_reserved_byte field may indicate a field reserved for future use.

Figure 41:
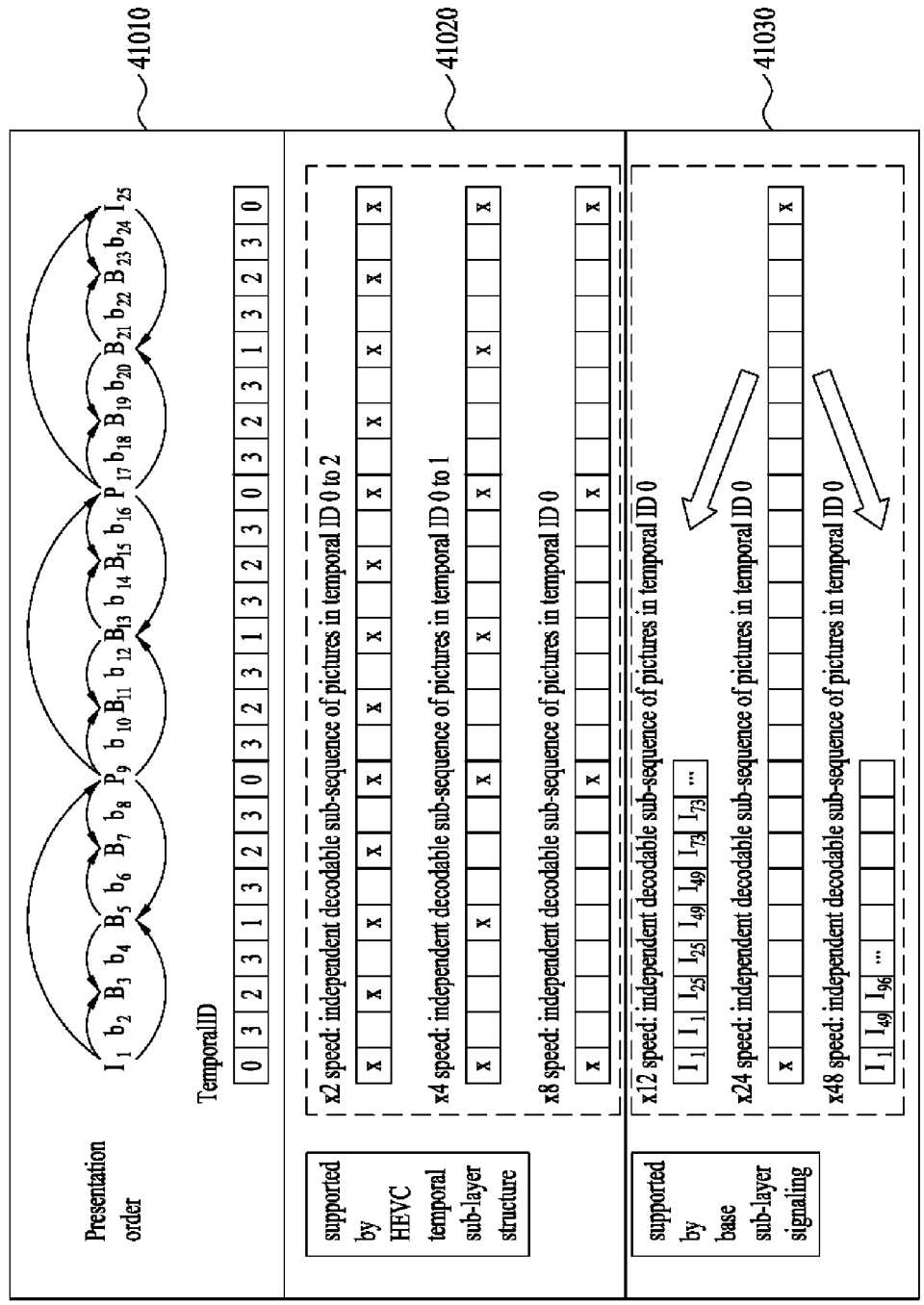
FIG. 41 is a view showing a trick play method using an HEVC temporal sub-layer according to an embodiment of the present invention.

FIG. 41 is a view showing a trick play method using an HEVC temporal sub-layer according to an embodiment of the present invention.

A first figure part 41010 of this figure shows that pictures corresponding to one GOP are arranged in presentation order. In the first figure part, I may indicate I pictures, B may indicate B pictures, and P may indicate P pictures. In addition, numerical subscripts of the alphabet indicating picture types may indicate presentation order. In the first figure part, arrows may indicate reference relationship among pictures.

A second figure part 41020 of this figure shows a method of providing a trick play using an HEVC temporal sub-layer according to an embodiment of the present invention. One quadrilateral box may indicate one picture. A number in each quadrilateral box may indicate a temporal id. Symbol x shown in each quadrilateral box may indicate a picture decoded and presented during execution of a trick play. As shown in the second figure part, X2 to X8 speed trick plays may be provided by the HEVC temporal sub-layer.

A third figure part 41030 of this figure shows a method of providing a trick play using base sub-layer signaling according to an embodiment of the present invention. An embodiment of the present invention may decode and present only intra pictures to provide X12, X24, and X48 speed trick plays.

Figure 42:
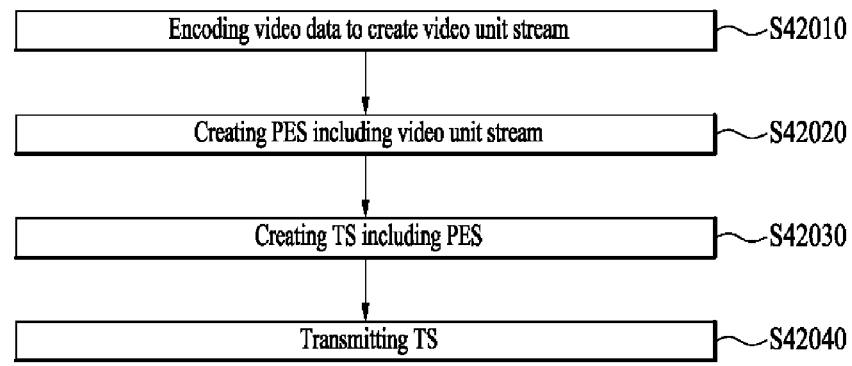
FIG. 42 is a view showing a broadcast signal transmitting method according to an embodiment of the present invention.

FIG. 42 is a view showing a broadcast signal transmitting method according to an embodiment of the present invention.

An embodiment of the present invention may transmit a broadcast signal through the following procedures. First, an embodiment of the present invention may encode video data to create a video elementary stream (ES) (S42010). The video elementary stream (ES) may be encoded by an AVC or HEVC codec. Next, an embodiment of the present invention may create a packetized elementary stream (PES) including the video elementary stream (ES) (S42020). Next, an embodiment of the present invention may create a transport stream (TS) including the PES (S42030). The TS may indicate an MPEG-2 TS. A TS according to an embodiment of the present invention may include PVR assist information for executing a trick play. The PVR assist information may mean information necessary for a receiver or a PVR apparatus to execute a trick play of video data. The PVR assist information has been previously described in detail with reference to FIG. 34. PVR assist information according to an embodiment of the present invention may include tier number information and/or maximum temporal identification information. The tier number information may indicate a tier number having a value obtained by adding 1 to a temporal identification information value of a picture different from a RAP picture and the maximum temporal identification information may indicate a maximum temporal identification information value of a video stream including encoded video data. Maximum temporal identification information according to an embodiment of the present invention may be named max_temporal_id or PVR_assist_max_temporal_id. The maximum temporal identification information has been previously described in detail with reference to FIGS. 32, 35, 36, 37, and 40. The tier number may be used to signal a temporal sub-layer. The tier number may indicate dependency between pictures. For HEVC, the tier number may be used to signal a temporal sub-layer in a similar manner to the temporal identification information. The tier number information may be named PVR_assist_tier_pic_num. The tier number information has been previously described in detail with reference to FIGS. 34, 35, 36, 39, and 40. Next, an embodiment of the present invention may transmit the created TS (S42040). An embodiment of the present invention may transmit a created broadcast signal through at least one selected from among a terrestrial broadcasting network, a cable network, and an Internet network. According to another embodiment of the present invention, a video elementary stream (ES) may include one or more temporal sub-layers and each temporal sub-layer may indicate a group of pictures. A NAL unit header including encoded video data according to an embodiment of the present invention may include temporal identification plus information. The temporal identification plus information may indicate a value obtained by adding 1 to a value of temporal identification information and the temporal identification information may include information for identifying a temporal sub-layer. Temporal identification plus information according to an embodiment of the present invention may be used to identify a temporal sub-layer. The temporal sub-layer may be named a temporal sub-layer, the temporal identification information may be named a temporal id, and the temporal identification plus information may be named nuh_temporal_id_plus1. According to an embodiment of the present invention, PVR assist information may include maximum temporal identification information indicating a maximum temporal identification information value of a video elementary stream (ES). A video stream encoded by HEVC may have several temporal sub-layers and each temporal sub-layer may be identified by temporal identification information. Maximum temporal identification information according to an embodiment of the present invention may mean temporal identification information of a temporal sub-layer having maximum temporal identification information among several temporal sub-layers. According to an embodiment of the present invention, PVR assist information may include temporal identification flag information indicating whether maximum temporal identification information is included. The temporal identification flag information may be provided for every RAP. The temporal identification flag information may be named PVR_assist_temporal_id_info_present_flag. The temporal identification flag information may have a value of 1 in a case in which the maximum temporal identification information is included in the PVR assist information. For an AVC stream, the temporal identification flag information may have a value of 0. An embodiment of the present invention may signal maximum temporal identification information every RAP since temporal identification flag information is provided for every RAP. Consequently, an embodiment of the present invention may signal maximum X speed information of a trick play every RAP, which has been previously described in detail with reference to FIGS. 35 and 40.

According to another embodiment of the present invention, a tier number indicated by the above-described tier number information may have a value of 0 for a RAP picture. A tier number according to an embodiment of the present invention may be decided every picture constituting a video stream. According to an embodiment of the present invention, a tier number may have a value of 0 for a RAP picture. A RAP picture according to an embodiment of the present invention may mean an HEVC DVB_RAP picture.

According to another embodiment of the present invention, maximum temporal identification information may be used to provide information regarding speed of a trick play. The maximum temporal identification information may signal information regarding the maximum X speed of a trick play. An embodiment of the present invention may signal an X speed of a trick play corresponding to each piece of temporal identification information. An embodiment of the present invention may inform a user of information regarding a serviceable maximum X speed by signaling the maximum temporal identification information, decide the X speed of the trick play according to a request of the user, and provide the decided X speed of the trick play to the user. According to an embodiment of the present invention, the maximum temporal identification information may have a value of any one selected from among 0 to 6. According to another embodiment of the present invention, therefore, a temporal identification information value may match with a tier number within a conventionally defined range of the tier number in a case in which the temporal identification information value matches with the tier number one to one. Conventionally, the tier number is defined from 0 to 7, which has been previously described in detail with reference to FIGS. 35 and 40.

According to another embodiment of the present invention, the above-described PVR assist information may be included in an adaptation field of a TS. The adaptation field, which is a field existing between a header and a payload of a TS packet, may include data. According to an embodiment of the present invention, the adaptation field may include a private data byte field and the private data byte field may include PVR assist information. The private data byte field may be included in the adaptation field and may include several data fields. One of the above-described several data fields may include PVR assist information.

According to another embodiment of the present invention, the above-described PVR assist information may include segment info flag information indicating existence or nonexistence of information regarding a segment to which a picture belongs, which has been previously described in detail with reference to FIG. 34.

According to another embodiment of the present invention, the above-described PVR assist information may include segment identifier information indicating an id of a segment to which a picture belongs, which has been previously described in detail with reference to FIG. 34.

According to another embodiment of the present invention, the above-described PVR assist information may include program identifier information indicating an id of a program to which a picture belongs, which has been previously described in detail with reference to FIG. 34.

According to another embodiment of the present invention, the above-described PVR assist information may include at least one selected from between segment start flag information for identifying a picture having a first presentation order in each segment and segment end flag information for identifying a picture having a last presentation order in each segment, which has been previously described in detail with reference to FIG. 34.

According to a further embodiment of the present invention, the above-described PVR assist information may include at least one selected from between program start flag information for identifying a picture having a first presentation order in each program and program end flag information for identifying a picture having a last presentation order in each program, which has been previously described in detail with reference to FIG. 34.

Figure 43:
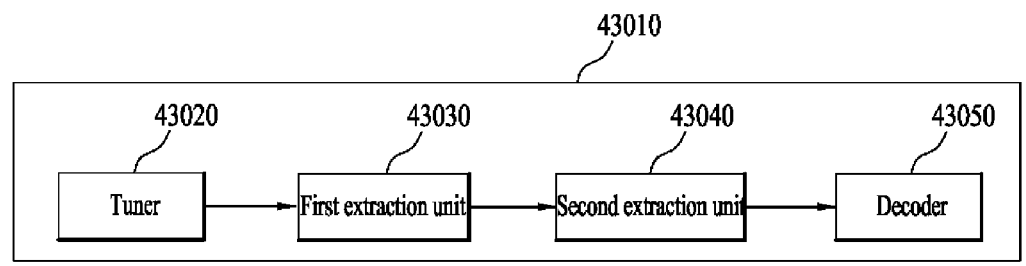
FIG. 43 is a view showing the structure of a broadcast signal receiving apparatus according to an embodiment of the present invention.

FIG. 43 is a view showing the structure of a broadcast signal receiving apparatus according to an embodiment of the present invention.

A broadcast signal receiving apparatus 43010 according to an embodiment of the present invention may include a tuner 43020, a first extraction unit 43030, a second extraction unit 43040, and/or a decoder 43050.

The tuner may receive a transport stream (TS). The TS may include PVR assist information for executing a trick play. The PVR assist information may include tier number information and/or maximum temporal identification information. The above-described tier number information may indicate a tier number having a value obtained by adding 1 to a temporal identification information value of a picture different from a RAP picture and the above-described maximum temporal identification information may indicate a maximum temporal identification information value of a video stream including encoded video data, which has been previously described in detail with reference to FIG. 42.

The first extraction unit may extract a packetized elementary stream (PES) from the received TS.

The second extraction unit may extract a video elementary stream (ES) from the extracted PES.

The decoder may decode the extracted video elementary stream (ES).

Components of a broadcast signal receiving apparatus according to an embodiment of the present invention shown in this figure having the same names as those of the broadcast signal receiving apparatus shown in FIG. 38 may perform the same functions as those of the broadcast signal receiving apparatus shown in FIG. 38.

Components of a broadcast signal receiving apparatus according to an embodiment of the present invention shown in this figure corresponding to the procedures of the broadcast signal transmitting method shown in FIG. 42 may perform functions corresponding to the procedures of the broadcast signal transmitting method shown in FIG. 42.

While the present invention has been described with reference to separate drawings for the convenience of description, a new embodiment may be implemented by combining embodiments illustrated in the respective drawings. As needed by those skilled in the art, designing a computer-readable recording medium, in which a program for implementing the above-described embodiments is recorded, is within the scope of the present invention.

The apparatus and method according to the present invention may not be limitedly applied to the constructions and methods of the embodiments as previously described; however, all or some of the embodiments may be selectively combined to achieve various modifications.

Meanwhile, the control method of the mobile device according to the present specification may be implemented as code that can be written on a processor-readable recording medium and thus read by a processor provided in the camera or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

It will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

In addition, the present specification describes both a device invention and a method invention, and descriptions of both the inventions may be complementarily applied as needed.

MODE FOR INVENTION

Various embodiments for carrying out the invention have been described in the best mode for carrying out the invention.

INDUSTRIAL APPLICABILITY

The present invention may be used in the broadcasting industry.

The invention claimed is:

1. A method of transmitting a broadcast signal, the method comprising:
    encoding video data to create a video elementary stream,
    wherein the video elementary stream includes a temporal sub layer for supporting temporal scalability,
    wherein the temporal sub layer is identified by a temporal identifier;
    creating a packetized elementary stream (PES) comprising the video elementary stream;
    creating a transport stream (TS) including the created PES, wherein the TS comprises PVR (Personal Video Recorder) assist information for executing a trick play, wherein the PVR assist information comprises temporal identifier flag information indicating whether maximum temporal identification information is present in the PVR assist information, wherein the PVR assist information comprises tier number information and the maximum temporal identification information, wherein the tier number information indicates a tier number obtained by using the temporal identifier of a picture in the temporal sub layer and the maximum temporal identification information indicates a maximum temporal identifier of the video elementary stream comprising the encoded video data, and wherein the maximum temporal identification information is used for providing speeds of the trick play supported from the video elementary stream; and transmitting the created TS.

2. The method of claim 1, wherein the tier number is 0 when the picture is a Random Access Point (RAP) picture and the tier number is equal to the temporal identifier of the picture plus 1 when the picture is different from the RAP picture, and wherein the temporal identifier is signaled by a nuh_temporal_id_plus1 field in a Network Abstraction Layer (NAL) unit carrying the picture of the temporal sub layer.

3. The method of claim 1, wherein the temporal identifier flag information is provided when the picture is a Random Access Point (RAP) picture.

4. The method of claim 1, wherein the PVR assist information is contained in an adaptation field of the TS.

5. The method of claim 1, wherein the PVR assist information comprises segmentation info flag information indicating existence or nonexistence of information regarding a segment to which a picture belongs.

6. The method of claim 5, wherein the PVR assist information comprises segment identifier information indicating an identifier (ID) of a segment to which a picture belongs.

7. The method of claim 1, wherein the PVR assist information comprises additional tier number information indicating an additional tier number, wherein the additional tier number indicates dependencies of pictures which have 0 as a value of the temporal identifier, wherein a higher speed trick play is provided by decoding pictures having 0 as a value of the temporal identifier and having a specific additional tier number, and wherein a lower speed trick play is provided by decoding pictures having 0 as a value of the temporal identifier and pictures having 1 or more as a value of the temporal identifier.

8. The method of claim 1, wherein the trick play is provided by only parsing a nuh_temporal_id_plus1 field in a Network Abstraction Layer (NAL) unit carrying the picture of the temporal sub layer without parsing the tier number information.

9. The method of claim 1, wherein the PVR assist information comprises frame number information indicating a number of frames existing between intra frames.

10. An apparatus of receiving a broadcast signal, the apparatus comprising:

a tuner configured to receive a transport stream (TS) including a packetized elementary stream (PES) comprising a video elementary stream, wherein the video elementary stream includes a temporal sub layer for supporting temporal scalability, wherein the temporal sub layer is identified by a temporal identifier, wherein the TS comprises PVR (Personal Video Recorder) assist information for executing a trick play, wherein the PVR assist information comprises temporal identifier flag information indicating whether maximum temporal identification information is present in the PVR assist information, wherein the PVR assist information comprises tier number information and the maximum temporal identification information, wherein the tier number information indicates a tier number obtained by using the temporal identifier of a picture in the temporal sub layer and the maximum temporal identification information indicates a maximum temporal identifier of the video elementary stream comprising encoded video data, wherein the maximum temporal identification information is used for providing speeds of the trick play supported from the video elementary stream;

a PES extractor configured to extract the packetized elementary stream (PES) from the TS;

a video elementary stream extractor configured to extract the video elementary stream from the extracted PES; and a decoder configured to decode the extracted video elementary stream using the tier number information and the maximum temporal identification information.

11. The apparatus of claim 10, wherein the tier number is 0 when the picture is a Random Access Point (RAP) picture and the tier number is equal to the temporal identifier of the picture plus 1 when the picture is different from the RAP picture, and wherein the temporal identifier is signaled by a nuh_temporal_id_plus1 field in a Network Abstraction Layer (NAL) unit carrying the picture of the temporal sub layer.

12. The apparatus of claim 10, wherein the temporal identifier flag information is provided when the picture is a Random Access Point (RAP) picture.

13. The apparatus of claim 10, wherein the PVR assist information is contained in an adaptation field of the TS.

14. The apparatus of claim 10, wherein the PVR assist information comprises segmentation info flag information indicating existence or nonexistence of information regarding a segment to which a picture belongs.

15. The apparatus of claim 14, wherein the PVR assist information comprises segment identifier information indicating an identifier (ID) of a segment to which a picture belongs.

16. The apparatus of claim 10, wherein the PVR assist information comprises additional tier number information indicating an additional tier number, wherein the additional tier number indicates dependencies of pictures which have 0 as a value of the temporal identifier, wherein a higher speed trick play is provided by decoding pictures having 0 as a value of the temporal identifier and having a specific additional tier number, and wherein a lower speed trick play is provided by decoding pictures having 0 as a value of the temporal identifier and pictures having 1 or more as a value of the temporal identifier.

17. The apparatus of claim 10, wherein the trick play is provided by only parsing a nuh_temporal_id_plus1 field in a Network Abstraction Layer (NAL) unit carrying the picture of the temporal sub layer without parsing the tier number information.

18. The apparatus of claim 10, wherein the PVR assist information comprises frame number information indicating a number of frames existing between intra frames.

* * * * *